US009432963B2

(12) United States Patent
Wilmhoff et al.

(10) Patent No.: US 9,432,963 B2
(45) Date of Patent: Aug. 30, 2016

(54) POSITIONING BEACON AND METHOD

(71) Applicant: BluFlux RF Technologies, LLC, Lousiville, CO (US)

(72) Inventors: Benjamin Russell Wilmhoff, Boulder, CO (US); Andrew David Rowser, Boulder, CO (US)

(73) Assignee: BluFux RF TECHNOLOGIES, LLC, Lousiville, CO (US)

( * ) Notice: Subject to any disclaimer, the term of this patent is extended or adjusted under 35 U.S.C. 154(b) by 0 days.

(21) Appl. No.: 14/684,237

(22) Filed: Apr. 10, 2015

(65) Prior Publication Data
US 2015/0296476 A1    Oct. 15, 2015

Related U.S. Application Data

(60) Provisional application No. 61/978,047, filed on Apr. 10, 2014.

(51) Int. Cl.
H04W 64/00    (2009.01)
H04W 4/00    (2009.01)
H04B 7/02    (2006.01)

(52) U.S. Cl.
CPC .............. H04W 64/00 (2013.01); H04B 7/026 (2013.01); H04W 4/008 (2013.01)

(58) Field of Classification Search
CPC ..... H04W 64/00; H04W 4/008; H04B 7/026
USPC ........... 455/456.1, 456.3, 56.5, 456.6, 404.2, 455/41.1, 41.2, 41.3
See application file for complete search history.

(56) References Cited

U.S. PATENT DOCUMENTS

| | | | | |
|---|---|---|---|---|
| 2,889,551 | A * | 6/1959 | Pickles | G01S 1/02 342/401 |
| 2,924,820 | A * | 2/1960 | Dishal | G01S 1/02 342/407 |
| 2,938,208 | A * | 5/1960 | Engel | G01S 1/02 343/761 |
| 3,795,914 | A * | 3/1974 | Pickles | H01Q 3/14 342/399 |
| 9,078,140 | B2 * | 7/2015 | Chou | H04W 16/28 |
| 2013/0260693 | A1 * | 10/2013 | Un | G01S 5/02 455/67.11 |
| 2015/0072618 | A1 * | 3/2015 | Granbery | H04W 4/008 455/41.2 |
| 2015/0189619 | A1 * | 7/2015 | Kalliola | G01S 1/02 455/456.1 |
| 2015/0289111 | A1 * | 10/2015 | Ozkan | H04W 4/04 455/456.1 |

* cited by examiner

*Primary Examiner* — Cong Tran
*Assistant Examiner* — CongVan Tran
(74) *Attorney, Agent, or Firm* — pkalousek.ip

(57) ABSTRACT

A method of determining a position of a mobile electronic device with respect to a beacon is provided. The beacon transmits three or more radio signals having unique identifiers in different directions within a plane. The method includes receiving the radio signals and determining the received signal strength of each of the received radio signals. The method also includes calculating signal strength difference values for pairs of the received radio signals and determining an azimuth of the mobile electronic device relative to the beacon based on the calculated signal strength difference values for the pairs.

37 Claims, 17 Drawing Sheets

POSITIONING BEACON AND METHOD

This application claims priority to U.S. patent application Ser. No. 61/978,047, filed Apr. 10, 2014, incorporated hereby by reference in its entirety.

FIELD

The present application relates to determining a position of one or more mobile electronic devices.

BACKGROUND

Portable and mobile electronic devices are commonly used for communication and entertainment purposes. The categories of portable and mobile electronic devices include devices such as smartphones, cellular phones, mobile communication devices, computers, tablet computers, phone-tablets (phablets), cameras, video players, audio players, electronic media readers, two-way radios, global positioning satellite (GPS) receiver devices, and/or other types of electronic computing or communication devices, including combinations thereof. The terms electronic device, mobile electronic device, portable electronic device, and device are used interchangeably herein to refer to any of these devices and/or any combination of these devices.

As the computational power and display capabilities of mobile electronic devices have increased, many new types of features and functions have been added to these devices. When Global Positioning Satellite (GPS) receivers were added to these devices, users and/or software applications running on the mobile electronic devices gained the ability to accurately determine the location of the device. GPS techniques provide many benefits when the mobile electronic device has a clear line of sight, or partially clear line of sight, to the sky. However, GPS techniques become limited in indoor environments because GPS signals are weak and typically cannot be detected or received in indoor environments.

As the use of portable electronic devices continues to increase, the desire to offer location based services (LBS) also increases. LBS are any type of electronic based services that include controls for location as control features in computer programs. LBS may include any type of service that determines or uses a location of one or more mobile electronic devices for purposes such as marketing, targeted marketing, location based marketing, entertainment, business applications, sports, health, social media, social marketing, navigation, transportation, gaming, emergency services, and/or safety. Many of these services involve activities or processes that are implemented indoors, partially indoors, or indoors under some circumstances.

In one example, a large retailer may wish to provide promotional information to a customer who is in the retailer's store. The retailer may wish to provide this information to the customer electronically and on a real time basis when the customer is in the store. Further, the retailer may wish to tailor the information based on a section of the store the customer is in and/or products the customer is near. In another example, an office located inside a large office complex may wish to provide a person real time navigational directions through the office complex in order to help the person more easily find the office. In yet another example, location based techniques may be used to help a visually impaired user navigate through an area using a mobile electronic device with audio or haptic feedback capabilities. Many other uses of location information are possible.

Some existing indoor positioning systems utilize beacons with little or no positioning accuracy. These systems are simply able to indicate whether an electronic device is within range of the particular beacon. In some cases, these systems may also generate a rough estimate of the distance of the electronic device from the beacon, but this estimate may be lacking is resolution or accuracy. In order to provide improved accuracy and/or more expansive coverage using known indoor position determination methods, a larger number of spatially distributed beacons must typically be used. However, using more beacons is undesirable due to increased equipment cost, increased installation costs, increased maintenance costs, and/or overall increased system complexity.

For the various reasons discussed above, there is demand for improved methods of providing indoor positioning and navigation capabilities. Improvements may lie in the areas of location accuracy, system simplicity, reduced system cost, simplified system implementation, and/or compatibility with existing capabilities. However, the apparatuses, techniques, and methods disclosed herein are not to be limited to any particular use or application.

There are multiple classes of stakeholders in indoor positioning and navigation technology. One class of stakeholders is the navigators or users of mobile devices who desire more accurate navigation and location information indoors. Another class of stakeholders is retailers and venue operators. This class of stakeholders stands to benefit from the ability to target market, target advertise, and/or provide other real time location relevant information to navigators. This class of stakeholders may also track the habits of navigators and generate data which relates navigator habits to sales or revenue data. In some situations, a party who monitors or generates this data may be separate from the party who is providing the products or services to the navigator. Another class of stakeholders is technology providers. Technology providers include hardware providers for indoor navigation, algorithm/application/software developers for navigation and data analytics, and/or original equipment manufacturers (OEMs), such as APPLE and SAMSUNG for example, who play an important role in helping other stakeholders gather and disseminate data.

SUMMARY

A method of determining a position of a mobile electronic device with respect to a beacon is provided. The beacon transmits three or more radio signals having unique identifiers in different directions. The method includes receiving the radio signals and determining the received signal strength of each of the received radio signals. The method also includes calculating signal strength difference values for pairs of the received radio signals by subtracting the determined received signal strength of a first radio signal of the pair from the determined received signal strength of a second radio signal of the pair. The method further includes determining an azimuth of the mobile electronic device relative to the beacon based on the calculated signal strength difference values for the pairs. Variations of this method are also provided, as well as apparatuses, systems, and computer-executable instructions for implementing these methods.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

There is increased demand for accurate indoor electronic positioning systems which are compatible with the types of portable and mobile electronic devices carried by many people. Indoor positioning information may be used for many types of applications including applications associated with marketing, targeted marketing, location based marketing, entertainment, business applications, managing employees, sports, gaming, health, social media, social marketing, transportation, navigation, emergency services, and/or safety. Some existing methods of determining location such as GPS, triangulation, and trilateration require transmission of signals from multiple locations and/or require receiving signals at multiple locations in order to determine a location. Other methods such as radio frequency (RF) fingerprinting and radio fingerprinting often require detailed RF mapping of the ambient environment of the indoor spaces in which they are used. In addition, RF fingerprinting and radio fingerprinting may be very susceptible to interference from other radio signals, signal variations due to the environment, and other factors. Disclosed herein are apparatuses, techniques, methods, and computer-executable instructions for implementing improved positioning systems that overcome these and other problems and which may be used in one or more of the fields discussed above.

Figure 1:
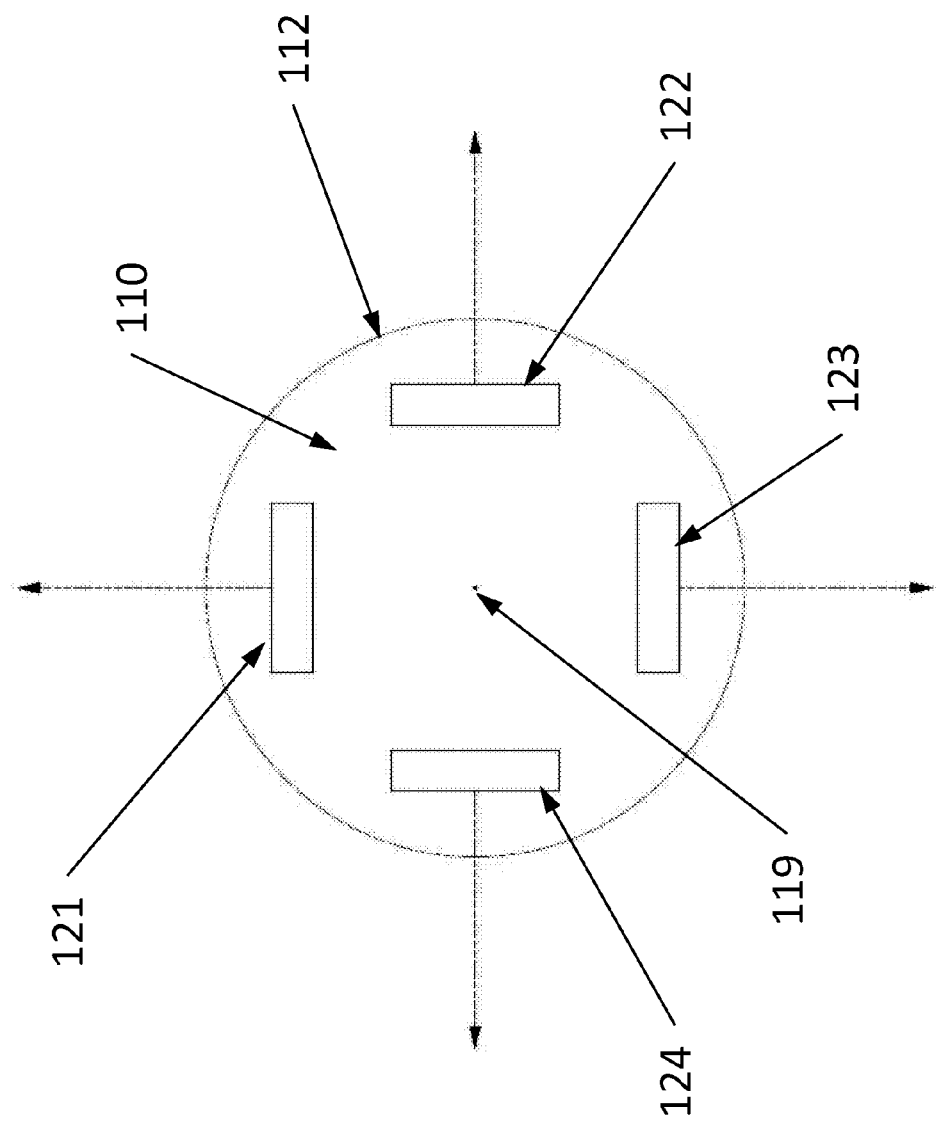
FIG. 1 illustrates a positioning beacon in one embodiment of the techniques and methods introduced herein.

FIG. 1 illustrates a positioning beacon 110 in one embodiment of the techniques and methods introduced herein. Positioning beacon 110 includes support structure 112 and RF transmission devices 121, 122, 123, and 124.

Support structure 112 may include any type of housing, structure, support, frame, platform, and/or mechanical apparatus for supporting RF transmission devices 121-124 and/or for holding transmission devices 121-124 in fixed positions. Support structure 112 may enclose RF transmission devices 121-124 or may leave one or more of RF transmission devices 121-124 exposed. Support structure 112 is illustrated as a single piece but may comprise multiple pieces. Support structure 112 is illustrated as having a round shape but may have a different shape, including a combination of shapes. Support structure 112 may also include features for mounting support structure 112 to another device or surface.

Beacon 110 may also include other components such as a power interface, a power supply, a battery, an electromechanical interface, an audible indicator, a visual indicator, a fan, a switch, and/or a user interface.

RF transmission devices 121-124 are each any type of electrical or electronic device for generating a radio signal. RF transmission devices 121-124 may include an antenna or may transmit radio signals using a separate antenna (not pictured). RF transmission devices 121-124 may also include other devices such as an amplifier, a modulator, a signal generator, a multiplier, a switch, a filter, an attenuator, a combiner, a power measurement device, an oscillator, a crystal, a microprocessor, a microcontroller, a digital signal processor, application specific circuitry, and/or other electrical components, either analog or digital.

Each of RF transmission devices 121-124 may be a separate assembly or two or more of RF transmission devices 121-124 may be included in a single assembly. In one example, two or more of RF transmission devices 121-124 may share an oscillator. In addition, RF transmission devices 121-124 may share one or more components or subassemblies. As explained in further detail below, in contrast to FIG. 1, beacon 110 may include as few as three RF transmission devices. In another example, also in contrast to FIG. 1, beacon 100 may have more than the four RF transmission devices illustrated in FIG. 1.

RF transmission devices 121-124 are positioned relative to axis 119 of beacon 110 such that they will transmit radio signals in four different directions (as illustrated by the dashed arrow lines). RF transmission devices 121-124 are also positioned such that the directions of the radio signals are in a plane, about in a plane, roughly in a plane, or approximately in a plane. The directions of the radio signals are such that the radio signals are transmitted primarily outward from axis 119 of beacon 110. RF transmission devices 121-123 are oriented such that the directions of the radio signals are at about ninety degree angles to each other and are directed outward from the axis 119 of beacon 110 forming four sectors or quadrants. In some configurations, beacon 110 may be installed such that one of the signal directions is aligned with earth's magnetic north so that each of the four signal directions is associated with one of north, south, east, and west. In one example, beacon 110 may contain a visible mark or pointer associated with one of the signal directions such that a person configuring or installing beacon 110 may orient beacon 110 with respect to magnetic north.

The signals transmitted by RF transmission devices 121-124 may be orthogonal such that the signals may be transmitted simultaneously using a same frequency range yet still distinguished from each other by a receiving device. In one aspect, the signals may be distinguished, e.g., by imparting a unique identifier onto the signal itself, at a layer higher than the Physical (PHY) or Media Access Control (MAC) Layer. In another aspect, orthogonality of the signals may be achieved at the PHY layer or MAC layer through time, frequency or other signal multiplexing or both.

In some configurations, beacon 110 may contain only three RF transmission devices. The three radio signals being transmitted in directions that define three about equally sized sectors. As will be illustrated in examples that follow, more than four RF transmission devices may be used such that more than four sectors results.

While the signal directions of FIG. 1 are illustrated as vectors, RF signals emanating from antennas typically have broader shapes in two or three dimensions. In other words, each of the RF signals may have a primary signal direction associated with the strongest portion of the signal but may have antenna patterns or radiation patterns that extends in many directions. A radio signal transmitted through an antenna having one of these types of antenna patterns is received at different strengths in different locations relative to the transmitter, even in different locations that are the same distance from the transmitter. In other words, the strength of the signal at a receive location provides some information about the spatial orientation of the receive location relative to the transmitter.

In some cases, antennas may produce cardioid shaped antenna patterns. The cardioid antenna patterns may have one or multiple lobes and/or other various characteristics. Other antenna patterns are possible. Although the apparatuses, techniques, and methods disclosed herein are discussed primarily with respect to cardioid shaped antenna patterns, they are not to be limited to any particular type of antenna or antenna patterns.

Figure 2:
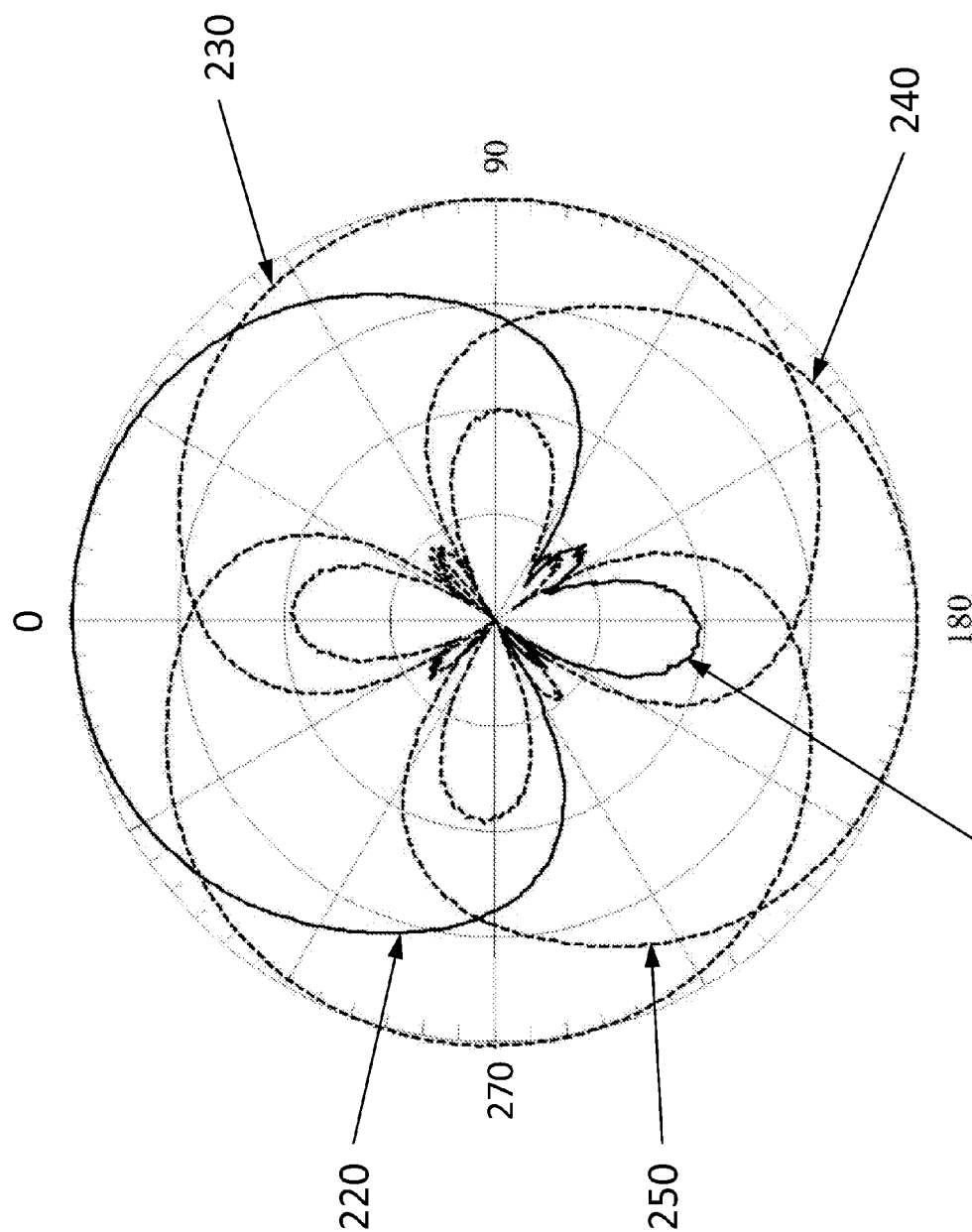
FIG. 2 illustrates cardioid shaped antenna patterns or four RF transmitters of a beacon in one embodiment of the techniques and methods introduced herein.

FIG. 2 illustrates cardioid shaped antenna patterns 220, 230, 240, and 250 produced by four RF transmitters of a beacon, such as beacon 110 (not pictured). The cardioid antenna patterns of FIG. 2 are superimposed on a polar chart with polar coordinates for purposes of explanation. Cardioid shaped antenna patterns 220, 230, 240, and 250 are examples of antenna patterns that may be associated with RF transmitters 121-124 of FIG. 1. Antenna pattern 220 is shown with a solid line while antenna patterns 230, 240, and 250 are shown with dashed lines for purposes of illustration. The distance from the center of the chart is proportional to the strength of the RF signal associated with the antenna pattern. Therefore, the RF signal associated with antenna pattern 220 is strongest at about zero degrees, or north. The RF signal associated with antenna pattern 230 is strongest to the east. The RF signal associated with antenna pattern 240 is strongest at about 180 degrees, or south. The RF signal associated with antenna pattern 250 is strongest to the west. In addition, each of the antenna patterns may have a back lobe such as lobe 221.

As illustrated in FIG. 2, the strength of the radio signal associated with each of the antenna patterns varies with respect to azimuthal position. Therefore, a received signal will have different strengths depending on the azimuthal position of the receiver. Determination of the received strength of a single RF signal may often not be sufficient for determining an azimuthal location. A single antenna pattern may have a given amplitude at more than one location. In addition, signal strength decreases as the receiver is moved farther from the sources. As illustrated in FIG. 2, multiple, if not all, of the antenna patterns overlap at any given location on the chart. Therefore, an azimuthal location on the polar chart of FIG. 2 may be more accurately determined by considering the strength of multiple RF signals and, as discussed further below, by making comparisons between the strengths of those signals.

Figure 3:
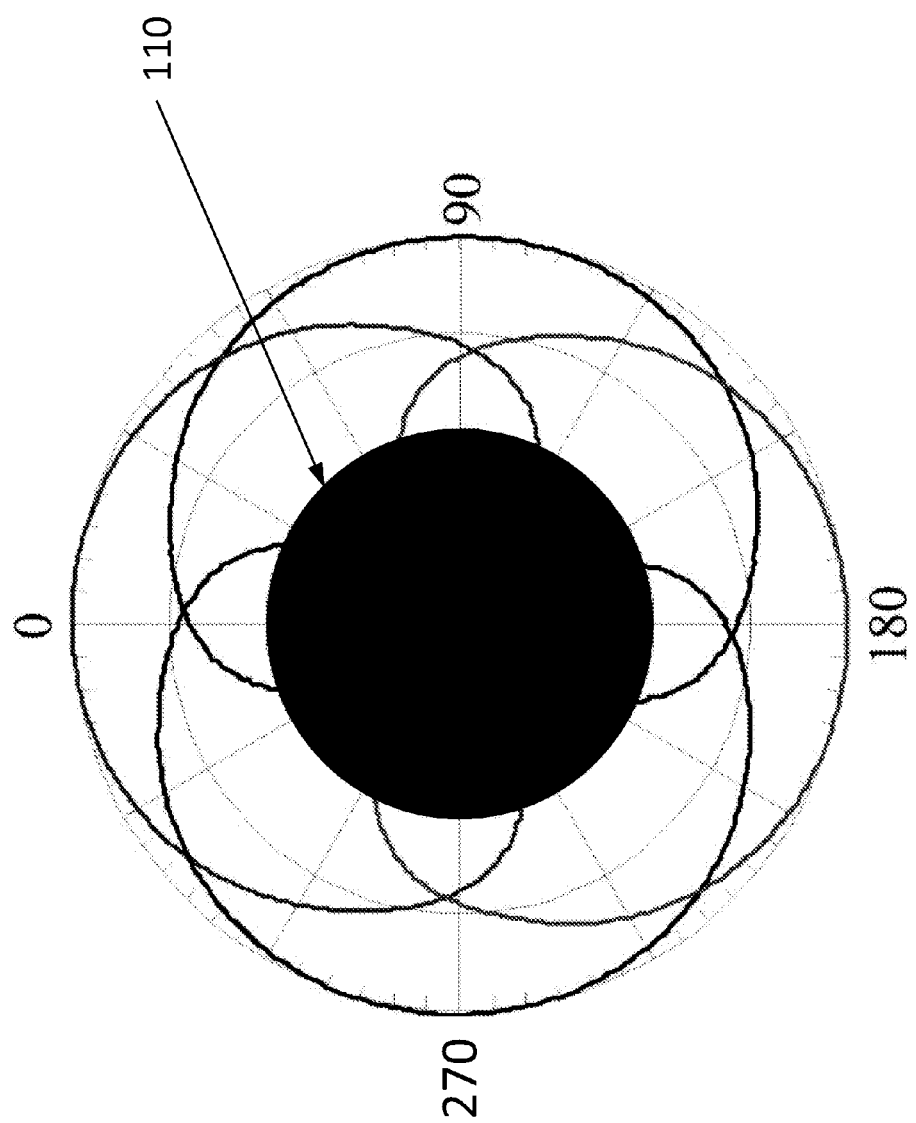
FIG. 3 illustrates an antenna pattern of a beacon in one embodiment of the techniques and methods introduced herein.

FIG. 3 illustrates antenna patterns of beacon 110 in one embodiment of the techniques and methods introduced herein. The four transmitters of beacon 110 have antenna patterns similar to those illustrated in FIG. 2. In the case that beacon 110 included only three RF transmitters, the antenna patterns would be spaced about 120 degrees from each other and would still overlap, although their overlap characteristics may differ due to the difference in spacing of the transmitters and antennas. However, in other cases, the antenna design may be altered or tuned based on the number of transmitters in order to achieve desired antenna pattern overlap characteristics or crossover characteristics. In one example, the antennas of a beacon having three transmitters may be designed or configured such that the antenna patterns are broader and have approximately the same overlap or crossover characteristics as the antenna patterns of the four transmitter beacon discussed in previous examples.

Figure 4:
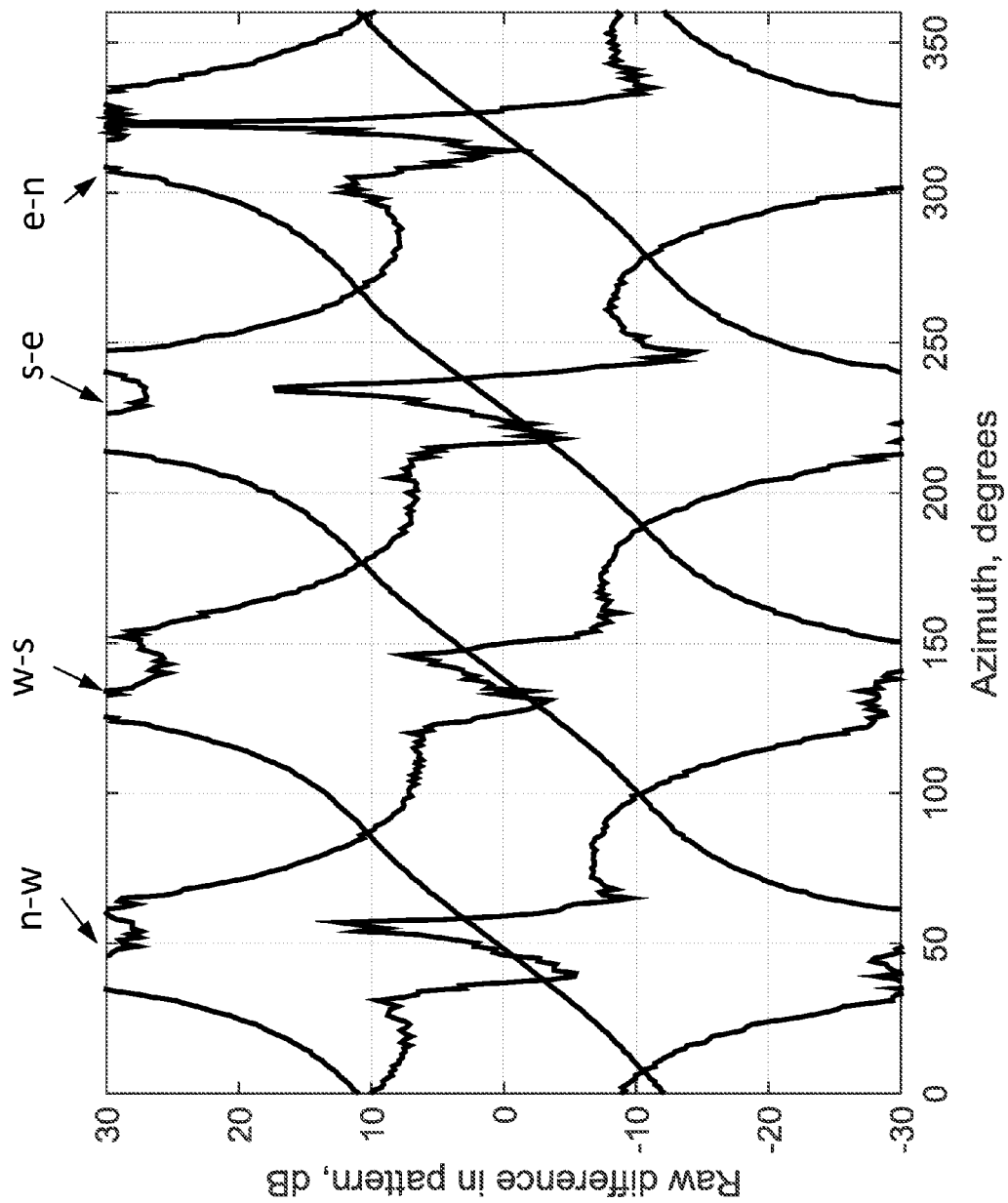
FIG. 4 illustrates signal strength difference values associated with the antenna pattern of FIG. 3.

FIG. 4 illustrates a chart of signal strength difference values in one embodiment of the techniques and methods introduced herein. More specifically, FIG. 4 illustrates a chart of signal strength difference values of pairs of signals transmitted from a beacon versus azimuthal position relative to the beacon. FIG. 4 illustrates these values for a beacon that has four transmitters, like beacon 110. Each of the traces plotted on the chart of FIG. 4 represents a difference between the strengths of received radio signals from various pairs of radio transmitters associated with a beacon. In other words, for a given azimuth the signal strength received from one transmitter of the beacon is subtracted from the signal strength received from another of the transmitters of the beacon. For example, at about one hundred degrees azimuth, a strength of the signal received from the west transmitter minus a strength of the signal received from the south transmitter ("w−s", or west minus south) is about 10 dB (decibels). In another example, the signal strength difference value for w−s is about −20 dB at about 160 degrees azimuth. In terms of determining location using the techniques disclosed herein, the differences between the strengths of received signals is often more important than the individual received signal strength values themselves.

In FIG. 4, the difference values are represented as "n−w," "w−s," "s−e," and "e−n." For purposes of illustration, these names are intended to correlate to difference pairs associated with particular directions. For example "n−w" refers to the value obtained at a particular azimuth by subtracting the strength of the signal received from the west transmitter ("w") from the signal strength of the signal received from the north transmitter ("n"). Referring back to FIG. 1, directions may be associated with each of RF transmission devices 121-124. For example, in one implementation the following relationships may exist: RF transmission device 121 is associated with north ("n"), RF transmission device 122 is associated with east ("e"), RF transmission device 123 is associated with south ("s"), and RF transmission device 124 is associated with west ("w"). Other spatial or geospatial relationships are possible. The various signals need not be associated with earth geographical directions and could be associated with other direction identifiers, such as features of or locations in a building. In the example of FIG. 4, the azimuth value of zero is associated with the north position; however other orientations or relationships are possible.

As will be illustrated in further detail below, charts similar to that of FIG. 4 may also be generated for configurations in which the beacon has a number of transmitters other than four. Generalizing beyond the case of four transmitters and/or four RF signals, if N signals are transmitted from N independent antenna beams, combination theory may be used to determine how many unique difference signals may be calculated. The calculation is as follows:

$$C = \frac{N!}{r!(N-r)!}$$

In the equation above, C is the total number of combinations of difference or delta signals. N is the total number of unique transmitted signals. r is the size of the difference subset being observed. In the example of FIG. 4, difference pairs are being observed so r equals 2. For the case of four transmitted signals (N=4), the equation above yields a total of 6 difference signals (C=6) pairs. Using the directional nomenclature of FIG. 4, the six pairs would be as follows: n−w, w−s, s−e, e−n, n−s, and e−w. It should be understood that reversing a given pair (e.g., subtracting n from w (w−n), rather than subtracting w from n (n−w)) results in different signal strength difference values. However, the signal strength difference values of these reversed pairs do not yield additional information in terms of determining a position. In other words, a plot of w−n versus azimuth is different than a plot of n−w versus azimuth. However, one may be obtained by inverting the other and neither contains new or incremental information over the other. Consequently, only one signal strength difference value associated with each pair is used and the reverse of that pair is not used.

Figure 5:
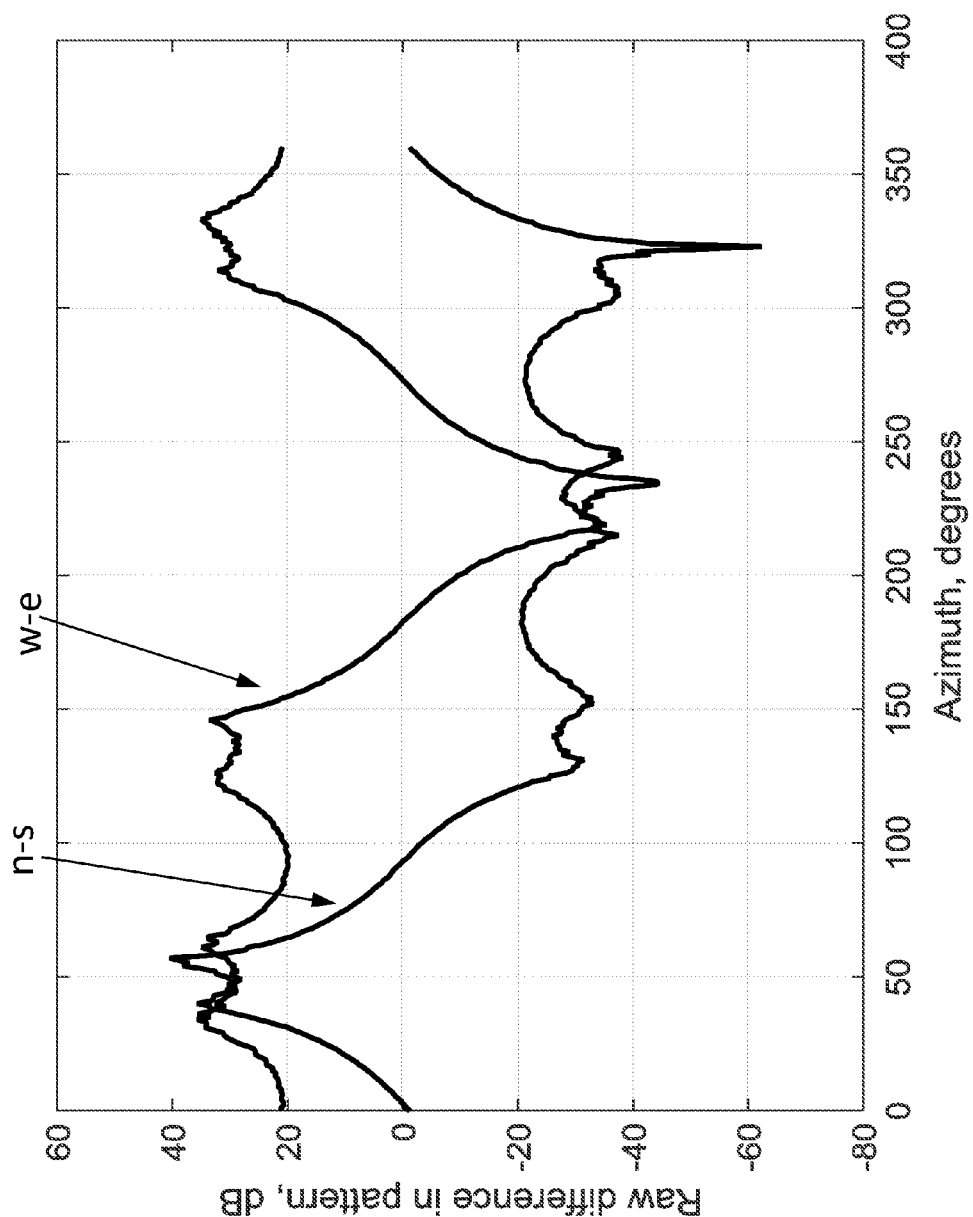
FIG. 5 illustrates signal strength difference values in one embodiment of the techniques and methods introduced herein.

While FIG. 4 illustrates signal strength difference values for four of the six possible signal pairs in a four signal configuration, FIG. 5 illustrates the signal strength difference values of the remaining two pairs. The signal pairs associated with FIG. 5 may be referred to as opposing pairs because they are associated with transmitters that are facing in opposite or about opposite directions (e.g., north and south or east and west). These combinations may be referred to as "opposite pairs." In contrast, the signal strength difference values of FIG. 4 are associated with pairs of transmitters that are adjacent to each other in the quadrature scheme of this example and may be referred to as "adjacent pairs." For opposite pairs, the signal strength difference values determined at any particular azimuth represent a comparison of the signal strengths from two opposing sides of a signal pattern. In other words, a n−s signal strength difference value represents a comparison of a signal associated with a front lobe of one of the pair to the a signal associated with a back lobe of the other or the pair or represents a comparison between opposing side lobes of each transmitter of the pair.

Opposing pairs of transmitters, or pairs having antenna patterns facing in opposite directions, often have more undesirable characteristics and may be less useful for location determination in some cases. Adjacent transmitter pairs tend to present scenarios in which one or more of the signal strength difference values are roughly linear characteristics in a particular azimuth range. In some configurations, the signal strength difference values of the adjacent pairs have the steepest change characteristics. This may be desirable because there are relatively large, but predictable, changes in the signal strength difference values over relatively small changes in azimuth. This behavior may function as a filter against noise, multipath effects, and/or quantization error.

As illustrated in FIG. 4, the adjacent pair comparisons typically have larger azimuthal ranges in which the signal strength difference values have linear or about linear, characteristics. Nonlinear and unstable regions of the signal difference curves are less useful because they are less reliable in determining azimuth and/or a single difference value may be associated with two or more azimuth values within a relatively small azimuthal range. For example, the e−n pair of FIG. 4 has a signal strength difference value of 0 dB at approximately 50 degrees, 215 degrees, 225 degrees, and 240 degrees. If a signal strength difference value of about 0 db for the e−n were identified, it could potentially be associated with any of these azimuths. While it would typically be relatively easy to distinguish between an azimuth of about 50 degrees and an azimuth in the 200 degree range using one of the other signal strength difference values, it may be more difficult to distinguish between 215, 225, and 240 degrees, even when using other signal strength difference values.

Signal strength difference values may be used to determine azimuth in a number of ways. One method includes using a 'matched filter' or correlating the various signal strength difference values for the pairs against a known table, lookup table, database, pattern, or mask associated with the beacon or antenna patterns. In some cases, use of a lookup table may also involve interpolating between values in the lookup table. It should be understood that comparing signal strength difference values to a database of stored values or to a stored pattern mask and the ability to generate a pattern mask based on some mathematical function or description of the azimuthal characteristics are the same as convolution/correlation/matched filtering. In some cases, the signal strength difference values must be normalized to some level or to a maximum value prior to matched filtering or processing. In some cases, the matched filter or mask pattern must be scaled to the same level as the received signal levels in order to make the correlation or matched filtering process more accurate. The correlation method may be combined with a least-squares or maximum likelihood estimator to reduce the impact of noisy or weak signals, such as those coming from an antenna or transmitter that is facing directly away from the receiver.

The following discussion provides one possible algorithm for determining the location of a mobile electronic device with respect to a beacon, such as beacon 110. The sample algorithm makes reference to the charts of FIGS. 4 and 5. The example is described with respect to an electronic device which is receiving radio signal transmissions from a beacon and is positioned at approximately forty five degrees with respect to north. However, this location is not initially known and is determined using this algorithm. While the algorithm is discussed with respect to steps performed by a mobile electronic device, the algorithms disclosed herein may be performed by the mobile electronic device, the performance of the steps on the mobile electronic device may be enabled using a software application running on or accessed by the mobile electronic device.

The electronic device receives the four signals transmitted by the beacon and determines a received signal strength or received signal strength indicator (RSSI) associated with each. Because the signals each contain a unique identifier, the electronic device is able to discern one signal from another. In addition, the electronic device may use the unique identifier to determine which of the signal/signal strengths is associated with each of north, south, east, and west. The electronic device then calculates the signal strength difference values for each of the four adjacent signal pairs using the received signal strength. Because the electronic device is presently in a single location, these signal strength difference calculations will provide a single value for each pair. In this example, the result will be computed signal strength difference values as follows: one large positive, one large negative, and two relatively close to 0 dB. Based on FIG. 4, this result means the azimuth of the location of the electronic device relative to the beacon could be in the neighborhoods of 50 degrees, 140 degrees, 230 degrees, or 320 degrees (see FIG. 4). However, based on the unique identifiers, it may be determined that the large positive signal strength difference value is associated with a n–w pair and the large negative signal strength difference values is associated with a s–e pair. Consequently, it is known that the location is in the neighborhood of 50 degrees as opposed to the other possibilities listed above. While it may have been possible to reach this conclusion based on either the n–w or s–e signal strength difference value alone, the use of multiple values, when possible, may improve reliability.

Once the quadrant or approximate location is known, the next step is to discard signal strength difference values that are known to be unstable in the region of interest. In this example, w–s is not useful in this region because it has multiple inflections within a relatively small azimuthal range and changes rapidly with azimuthal angle. This is because the location is near nulls of the patterns of both the west and south antennas.

Next, based on the quadrant determination above, an adjacent pair is identified that is expected to have a signal strength difference value that is more linear than the others in the quadrant. For example, because the n–w and s–e signal strength difference values have the largest absolute values in the identified region, it is known that the e–n signal strength difference value will be the most linear in this region. This is inherent in the quadrature structure of the antennas and antenna patterns in this example. The location determination is then fine-tuned using previously determined characteristics of the e–n antenna pattern. It may have been previously determined that the signal strength difference value varies with azimuth angle at a known rate of change. In one example, the value of the e–n difference value may change with respect to azimuth angle (e.g., $\partial\Delta/\partial\phi$) by 0.27 dB per degree of azimuth. The rate of change of the signal strength difference value with azimuth angle, as well as any other parameters necessary for the may be provided to the location determination may be provided to the entity carrying out the algorithm, i.e., the mobile electronic device or a remote computing system, by transmission from the beacon, pre-storing the parameters on the entity or, as a part of a software application as disclosed infra. This is one example and this rate of change may be highly dependent on the transmitter, transmitter characteristics, antenna, antenna characteristics, and/or array geometry. The value of the e–n difference signal is expected to be 0 dB at the forty five degree angle due to the symmetry of the configuration because the expected reading of the east and north transmitters will typically be the same at this position. As the location changes to an azimuth of more than or less than forty five degrees it is expected that the value of the e–n signal strength difference value will increase or decrease, respectively, by about 0.27dB per degree of azimuth, respectively.

While the techniques described above primarily utilize a single signal strength difference value that is about linear in the region of interest once the quadrant has been determined, more than one of the signal strength difference values may be used in other circumstances. In one example, when the device location moves away from the center regions of the quadrants (e.g., the location moves further away from 45 degrees, further away from 135 degrees, further away from 225 degrees, or further away from 315 degrees), more than one of the signal strength difference values may be in a linear, or near linear, region. For example, referring back to FIG. 4, as the azimuth of the location changes from near 45 degrees and becomes closer to 90 degrees, the n–w and s–e signal strength difference values also begin to have more predictable, gradual, and/or linear behaviors. Therefore, one, two, or even three signal strength difference values may be used to make the final azimuth determination calculation. Using more than one of the signal strength difference values to make the final calculation may make the result more accurate and/or provide an alternative if one of the signals is experiencing interference or other challenges.

Transmitters 121-124 of beacon 110 may transmit a wide variety of types of signals in accordance with the techniques and methods described herein. In one example, transmitters 121-124 comprise BLUETOOTH or BLUETOOTH LOW ENERGY (BLE) transmitter modules. BLUETOOTH is a wireless technology standard for exchanging data over short distances in unlicensed Industrial, Scientific, and Medical (ISM) bands. BLUETOOTH is used with fixed and mobile devices and used for building personal area networks (PANs). BLE is a PAN technology derived from BLUETOOTH which offers lower power consumption, reduced cost, and/or other benefits while maintaining a communication range similar to that of BLUETOOTH. In some configurations, BLE may provide unique benefits. In one example, the lower power requirement of BLE may enable a beacon to be powered by a battery for a longer period of time. In addition, on some mobile electronic devices, the RSSI for received BLE signals is more readily accessible to the device or software applications than is the RSSI for other types of received radio signals, such as WiFi.

In a further variation of the techniques disclosed herein, position determination may be further improved by evaluating differences between two or more of the signal strength difference values in addition to evaluating the signal strength difference values themselves. For example, in the examples discussed above with respect to FIG. 4, in addition to using one or more of the signal strength difference values (e.g., n–w, w–s, s–e, e–n, n–s, or e–w), differences between these signal strength difference values may also be utilized, such as n–w minus w–s or ((n–w)–(w–s)). Any combination of the signal strength difference values is possible, including combinations from opposing portions of the quadrant, such as ((w–s)–(e–n)). In some cases, these differences between the signal difference values may be referred to as higher order moments. One or more of the higher order moments may be used in conjunction with the signal difference values to further improve the positioning accuracy. One or more of the higher order moments may also be used in conjunction with the signal difference values to identify and/or reduce the effects of undesirable signal characteristics such as noise or multipath interference.

It should be understood that the apparatuses, method, and techniques disclosed herein may be implemented using transmitters and/or radio signals of various types and are not to be limited to BLUETOOTH or BLE. In some examples, the apparatuses, methods, and techniques disclosed herein may be implemented using WiFi signals. The apparatuses, methods, and techniques disclosed herein may also be implemented using a combination of signal types, signal formats, signal protocols, and/or modulation techniques.

In the case of BLE, each of transmitters 121-124 may transmit on one of three BLE advertising channels which fall in the 2.4 GHz ISM band. The three advertising channels, channels 37, 38, and 39 from the BLUETOOTH 4.0 protocol, correspond to frequencies 2402 MHz, 2426 MHz, and 2480 MHz, respectively. In one variation, the BLE modules may be operated in what is known as the 'BLE Proximity Profile,' in which data is broadcast one-way, from the BLE transmitter outwards on one of these three channels. The data payload may include a unique identifier for the transmitter, such as a Universally Unique Identifier (UUID). The unique identifier can be used by a receiving device to distinguish the signals from each other, to distinguish one beacon from another, to determine an identity associated with the beacon, to identify an orientation of the transmitter, to identify a direction the transmitter is facing, and/or for other purposes. In addition, the transmission may include information indicating the transmit power of the signal. In some cases, the transmit power is a Radio Signal Strength Indicator (RSSI). The unique identifier, the transmit power, and/or any other information included in the signal may be modulated or encoded using one or more of any known modulation or encoding techniques.

In addition to determining the azimuth as described in the examples above, a mobile electronic device receiving signals from a beacon, such as beacon 110, may also be configured to determine a distance or radius from the beacon. This distance or radius may also sometimes be referred to as the range. The distance from the beacon may be determined in one or more different ways.

In one example, the distance is determined by calculating the difference between the transmit power of one or more of the signals, as indicated in the transmission, and the received strength of those signal(s) as determined by the electronic device receiving those signals. The difference may be calculated by determining the decrease in signal strength of one or more of the signals and determining a distance based on the decrease and known loss characteristics through the medium.

In some cases, the methods disclosed herein may further include transmitting a signal through an omnidirectional antenna of the beacon to be used in determining the distance of the mobile electronic device from the beacon. The omnidirectional antenna will produce an RF signal that has little or no azimuthal variation such that the strength of the signal can be used in determining the distance from the beacon without having to compensate or adjust for azimuthal position. In one variation, the signal received from the omnidirectional antenna may be used in combination with the signal(s) received from one or more of the other transmitters to improve the azimuthal position calculation and/or to improve the distance calculation.

In another example of determining a distance of the mobile electronic device from the beacon, the antenna pattern of one more of the transmitters exhibits a roll off in the elevation plane. In other words, the transmitters are aligned and aimed in a primary plane and the signal strength of the transmitted signals rolls off in planes above or below the primary plane. In other words, if a beacon is mounted on a ceiling of a building and the transmitters are oriented to transmit in a plane parallel to the ceiling, i.e., the primary plane, a mobile device positioned some distance below the ceiling will receive weaker signals than would be received if the mobile device was at ceiling height. In some cases, the roll off occurs in proportion to a cosine function. This means that a receiving device positioned directly under a beacon will receive signals that result in signal difference patterns modulated by the cosine of the depression angle below horizon defined by the line that is perpendicular to the cylindrical axis 119 of the array. Using information about how the various transmitted signals roll off relative to each other, the signal strength difference values may also be used to calculate a distance of the receiving device from the beacon.

In yet another example of determining a distance of the mobile electronic device from the beacon, the beacon includes one or more additional transmitters positioned such that the antenna pattern of the additional transmitter is aimed or directed in a direction that is about perpendicular to the other transmitters. In other words, with respect to beacon 110 of FIG. 1, the additional transmitter would be aimed or directed into or out of the page. For example, if a beacon is positioned overhead such that the transmitters are transmitting signals about parallel to the floor, the additional transmitter may be positioned such that it is transmitting downward toward the floor. In other words, the additional transmitter may be transmitting perpendicular, or about perpendicular, to the other transmitters. Because the transmitters have antenna patterns of known shapes and orientations, comparisons of the received signal strengths from the various transmitters may be used to determine the elevation angle of the receiving device relative to the beacon and/or the distance of the receiving device from the beacon. While this example is described with respect to a single additional perpendicular transmitter, other configurations that achieve similar results are possible. Other configurations may include more than one additional transmitter, each being pointed in a direction other than parallel to the primary plane and in directions other than perpendicular to the primary plane.

Figure 6:
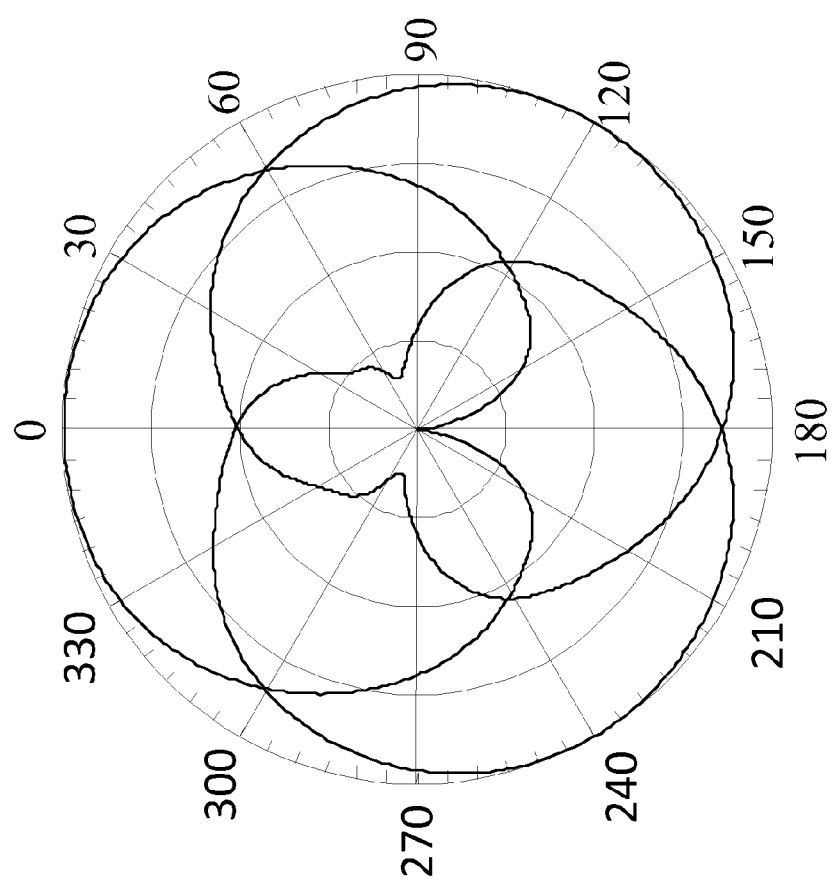
FIG. 6 illustrates an antenna pattern for a beacon having three transmitters in one embodiment of the techniques and methods introduced herein.

FIG. 6 illustrates an antenna pattern for a beacon having three transmitters. In contrast to beacon 110 of FIG. 1 and the examples of FIGS. 2-5, the antenna patterns of FIG. 6 are associated with three transmitters having about equal spacing such that the resulting antenna patterns have about one hundred twenty degree relationships relative to each other. The antenna patterns of FIG. 6 overlap each other although their overlap characteristics are different than those illustrated in FIGS. 2 and 3. Because the antenna patterns overlap, a mobile electronic device in an area around a beacon that is generating signals with the illustrated patterns will be able to receive multiple of the signals. The differences between the signals may then be analyzed to determine the location of the mobile electronic device using techniques similar to those described with respect to FIGS. 1-5.

As discussed above, the antennas associated with any of the examples described herein may be designed, adjusted, or configured to produce antenna patterns having different characteristics. For example, the antennas associated with the antenna patterns of FIG. 6 may be configured to have wider antenna patterns such that the crossover characteristics of each antenna pattern, relative to its neighbor antenna patterns, are similar to the crossover characteristics of the antenna patterns of FIG. 3. In other words, broader or narrower antenna patterns may be utilized based, at least in part, on the number of transmitters used in a beacon in order to accomplish desired antenna overlap characteristics.

Figure 7:
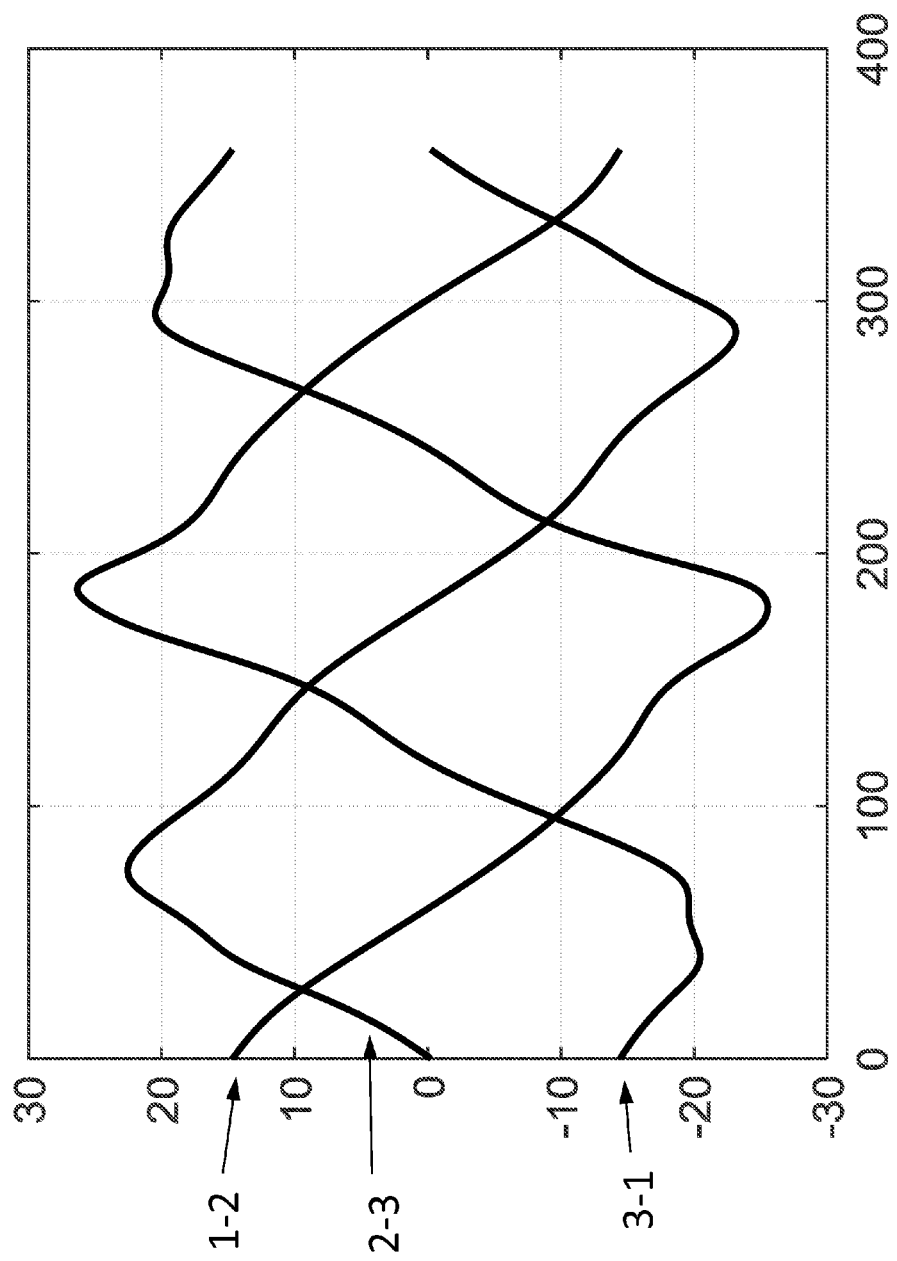
FIG. 7 illustrates a chart of signal strength difference values associated with the antenna pattern of FIG. 6.

FIG. 7 illustrates a chart of signal strength difference values associated with the antenna pattern of FIG. 6. FIG. 7 is similar to FIG. 4 but illustrates one example of signal strength difference values for a configuration having 3 transmitters. For purposes of explaining FIG. 7, the transmitters are numbered 1, 2, and 3. Since there are three transmitters, there are three potential pairs of signals. The signal strength difference values associated with those pairs are "1-2" (1 minus 2), "3-1" (3 minus 1), and "2-3" (2 minus 3). As discussed with respect to FIG. 4, the inversions of each of these signal strength difference values is not used (e.g., 2-1 is not used because 1-2 is used) because the inverted pair (2-1) does not provide incremental information beyond the information provided by the primary pair (1-2). As illustrated in FIG. 7, the signal strength difference values vary with azimuthal location such that two or more signal strength difference values received by a mobile electronic device may be used to determine or estimate an azimuth of the location of the mobile electronic device using techniques similar to those described above.

Figure 8:
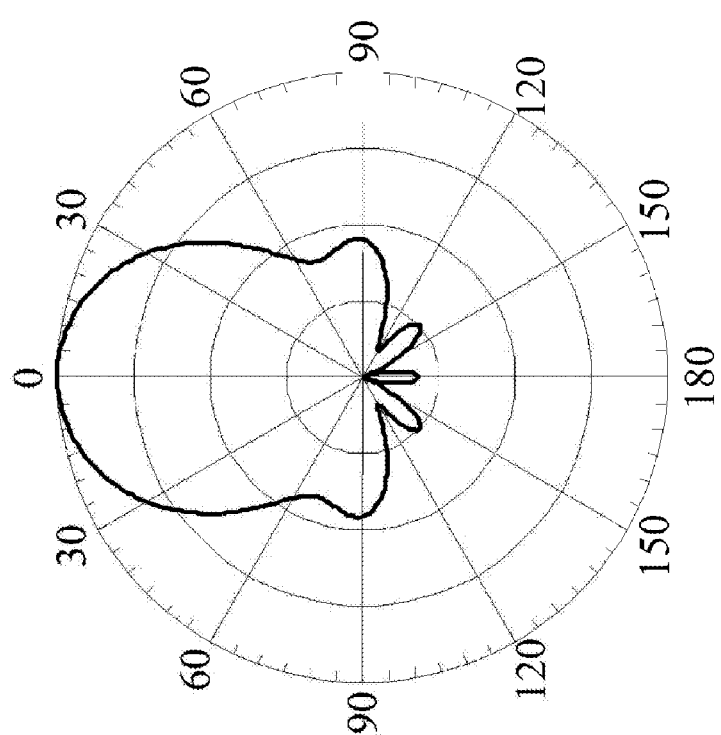
FIG. 8 illustrates an antenna pattern associated with a single transmitter.

FIG. 8 illustrates an antenna pattern associated with a single transmitter. The antenna pattern of FIG. 8 has a different shape than the cardioid shaped antenna patterns of previous examples. However, because the antenna pattern varies with azimuth, signals transmitted from an antenna having the antenna pattern may be used to determine a location of a portable electronic device using the methods and techniques described herein. When a larger number of transmitter elements are used, it may be useful to utilize antennas having narrower antenna patterns. In some cases, the methods and techniques disclosed and claimed herein are not to be limited to any particular type of antenna or any particular type or shape of antenna pattern.

Figure 9:
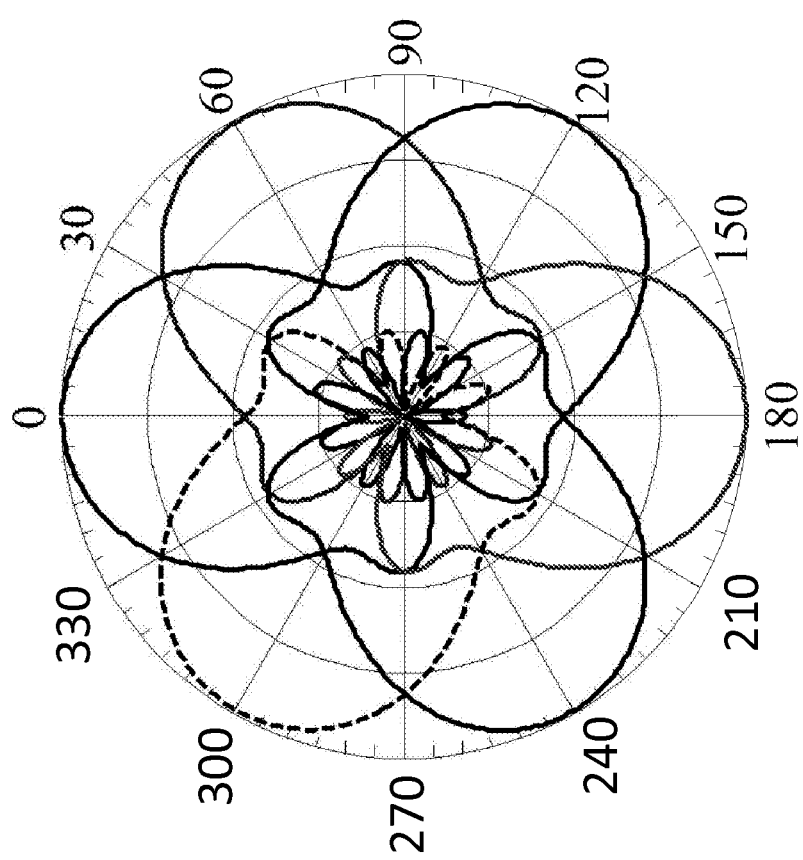
FIG. 9 illustrates an antenna pattern for a beacon having six transmitters.
Figure 10:
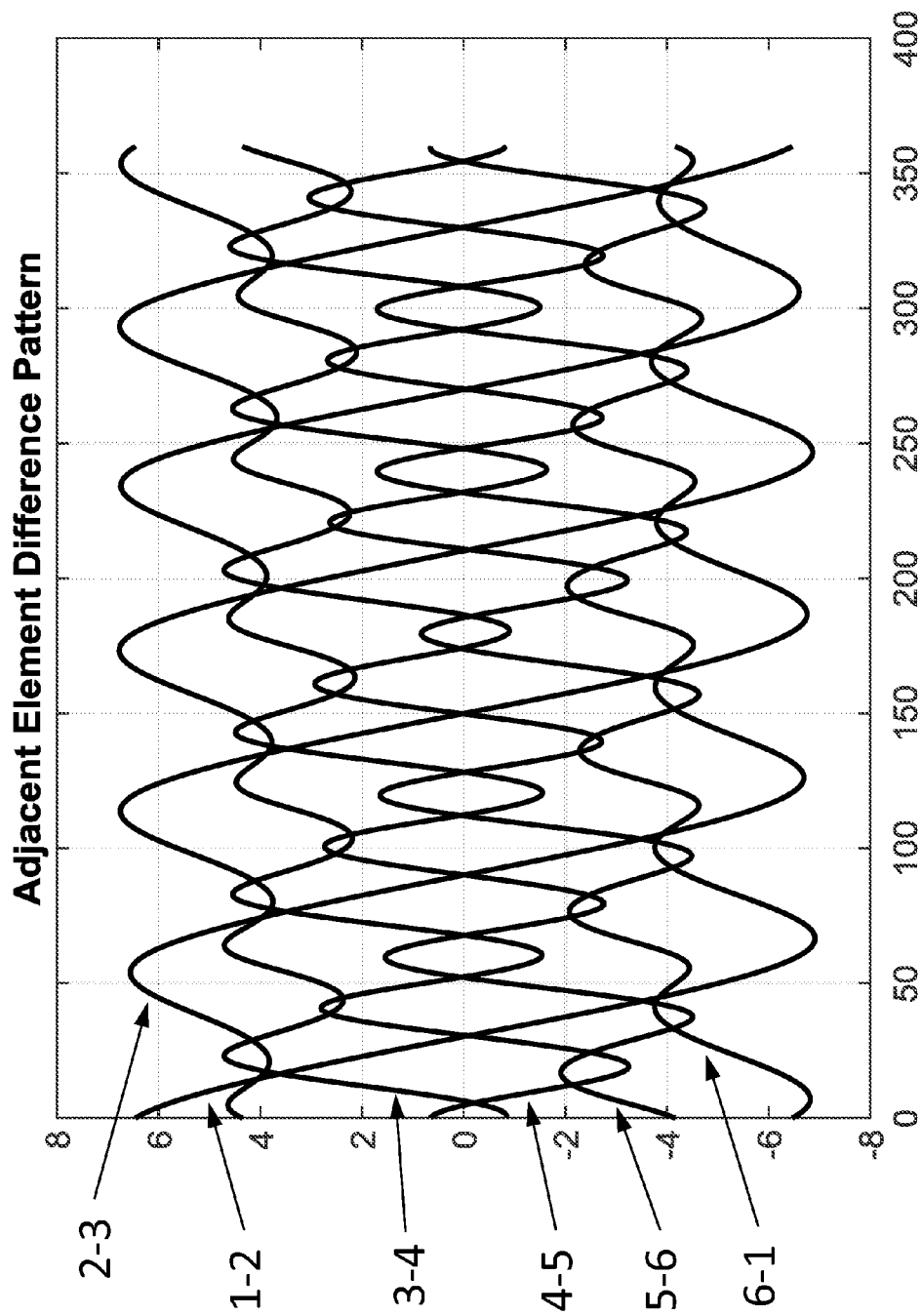
FIG. 10 illustrates signal strength difference values associated with a beacon having the antenna pattern of FIG. 9.

FIG. 9 illustrates antenna patterns for a beacon having six transmitters with antenna patterns similar to the antenna pattern of FIG. 8. Using the combination theory equation discussed above, it may be determined that there are 15 signal pairs when the number of transmitters, N, equals 6. However, adjacent pairs of transmitters often yield the most useful information. FIG. 10 illustrates signal strength difference values for adjacent transmitter pairs of a beacon having the antenna patterns of FIG. 9.

Figure 11:
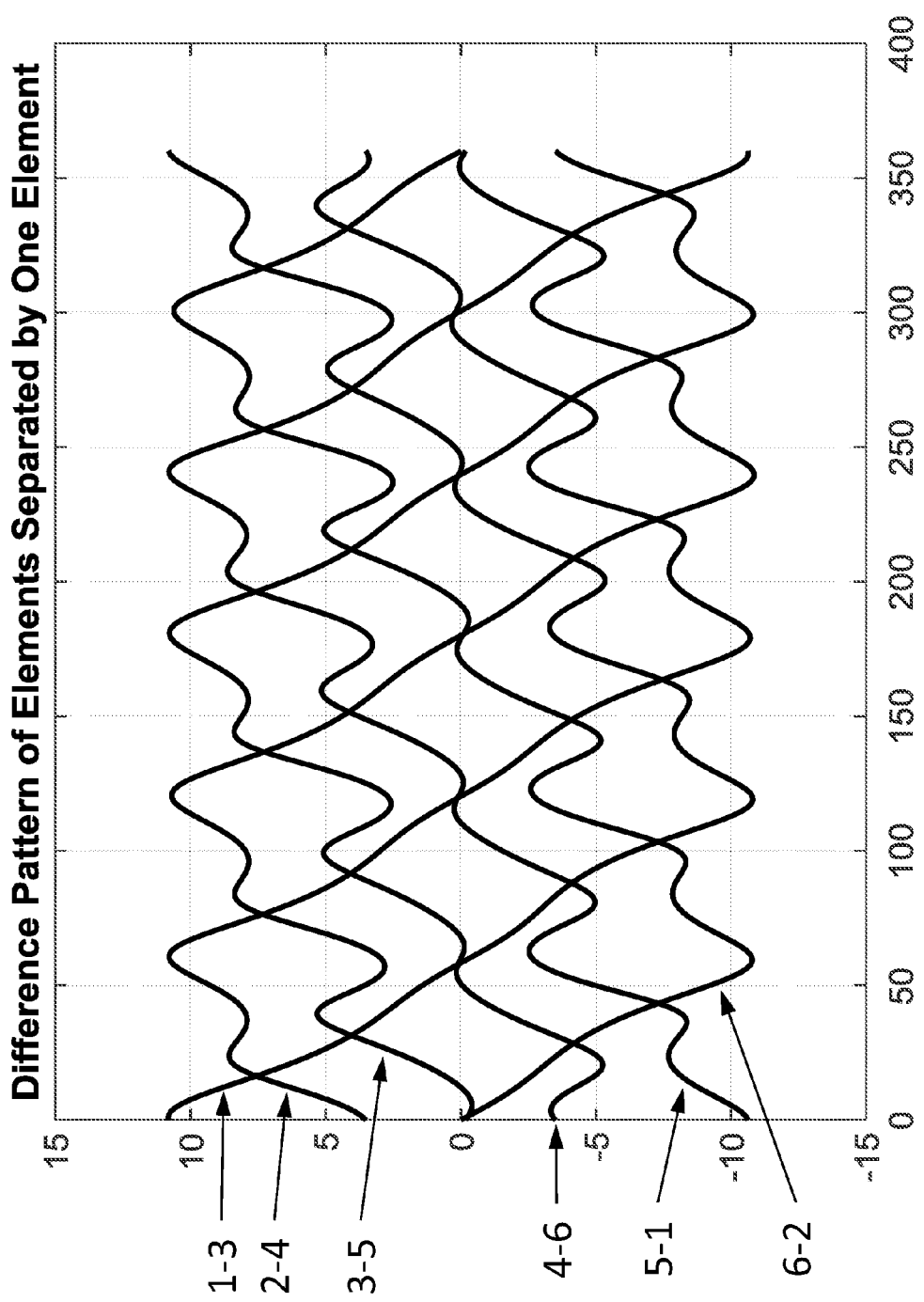
FIG. 11 illustrates signal strength difference values for pairs of transmitters that are separated by another transmitter.

As the number of transmitters and antenna patterns in a beacon increases, transmitters and antenna patterns separated by a relatively small number of elements (as compared to the total number of elements in the array) may also provide useful information. FIG. 11 illustrates signal strength difference values for pairs of transmitters that are separated by another transmitter. In other words, with reference to FIG. 9, the signal strength difference data labeled "1-3" on FIG. 11 represents the signal strength difference values between the transmitter with the antenna pattern that peaks at zero degrees azimuth and the transmitter with the antenna pattern that peaks at 120 degrees azimuth. The other traces of FIG. 11 similarly represent signal strength difference for pairs of transmitters that are separated by one other transmitter.

Figure 12:
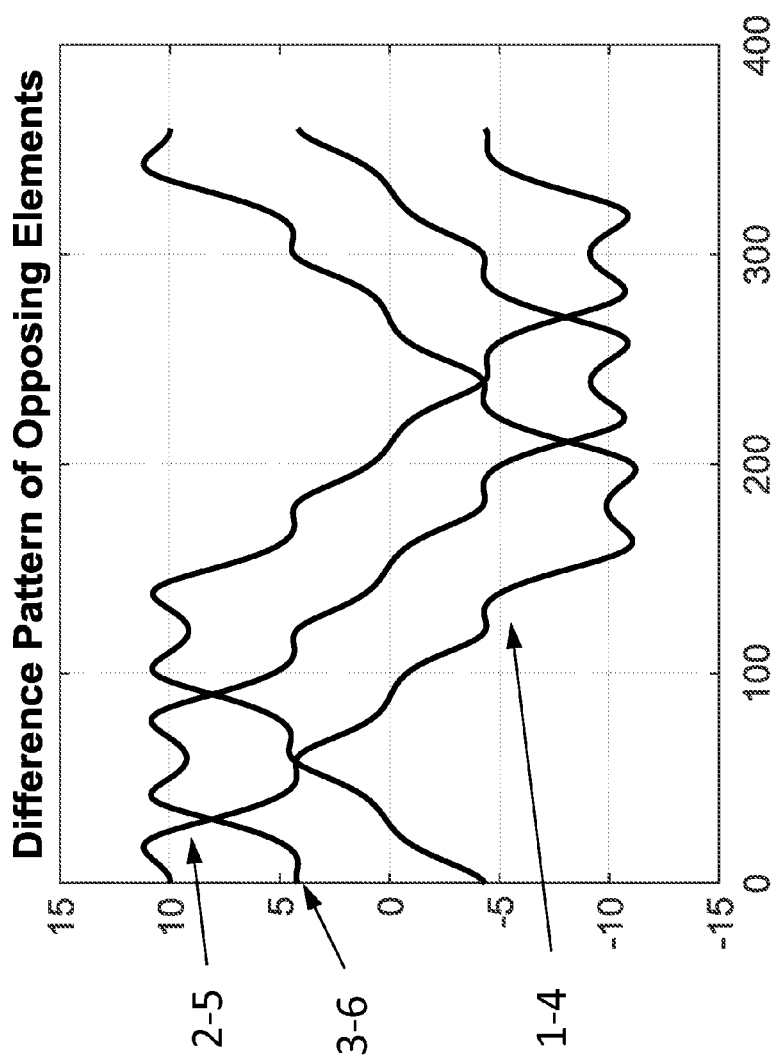
FIG. 12 illustrates signal strength difference values for opposing elements.

FIG. 12 illustrates signal strength difference values for the opposing antenna patterns of FIG. 9.

Figure 13A:
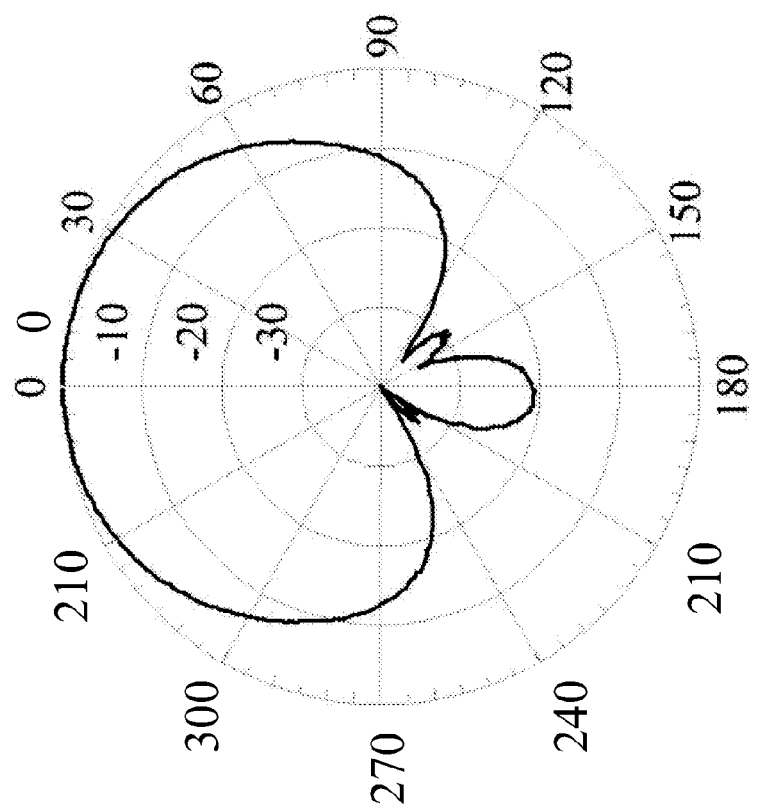
FIG. 13A illustrate an antenna pattern.
Figure 13B:
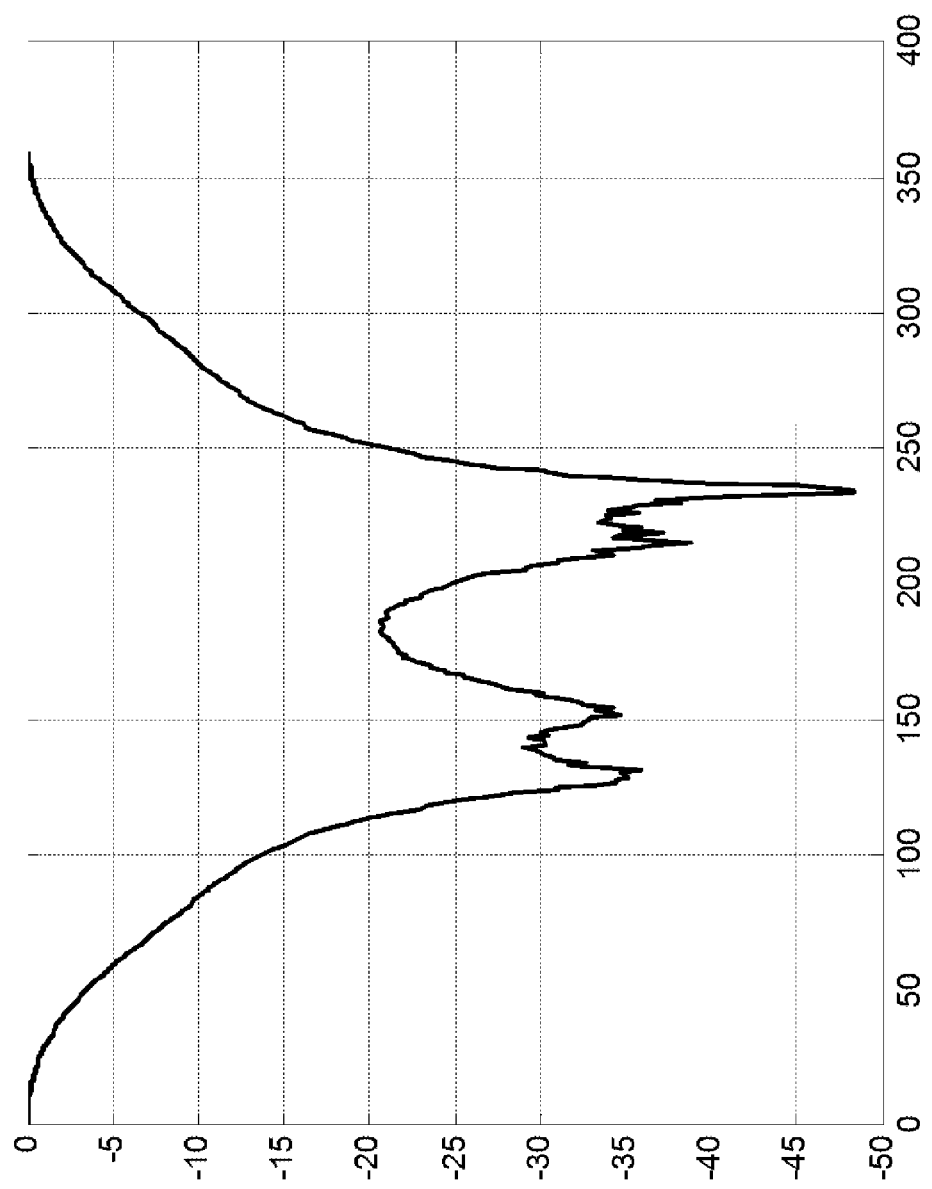
FIG. 13B illustrates a back lobe of the antenna pattern of FIG. 13A using Cartesian coordinates.
Figure 14:
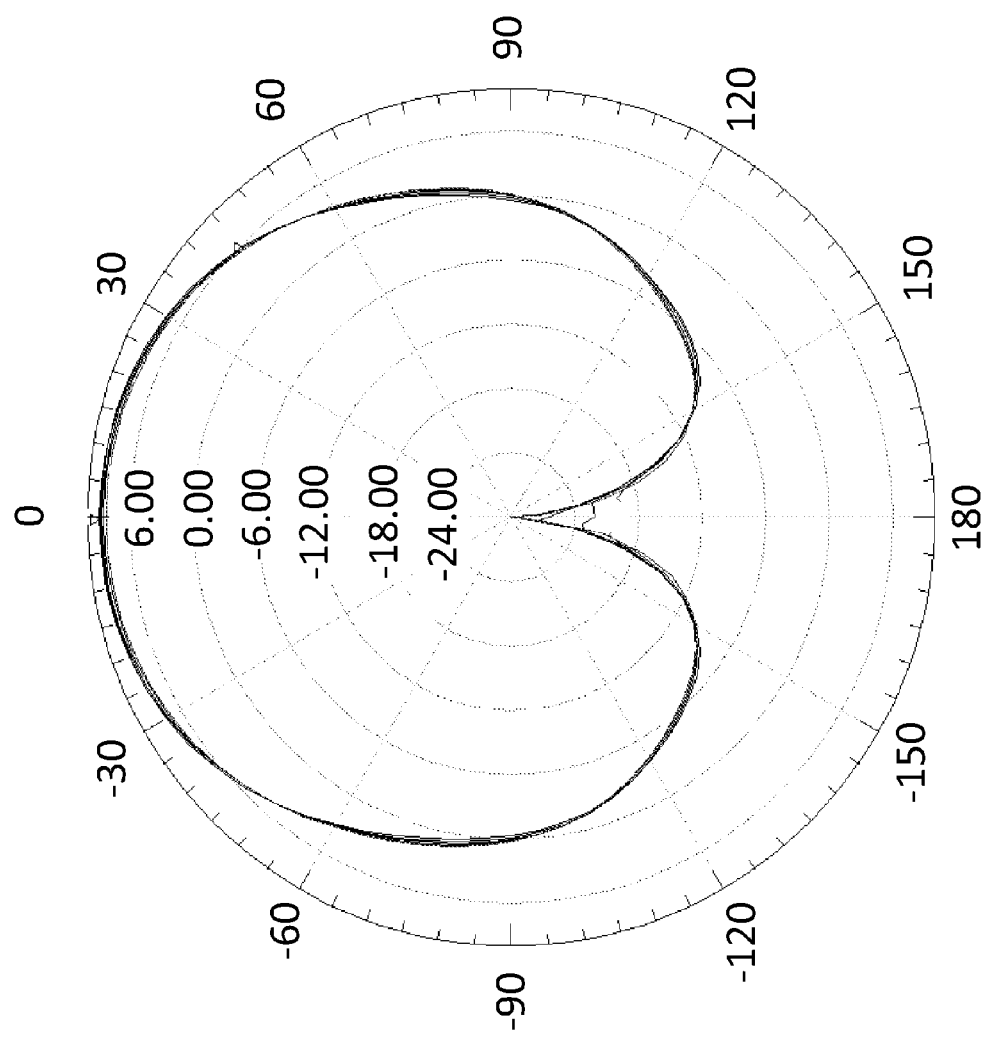
FIG. 14 illustrates an antenna pattern having a sharp null in the back lobe.

The antenna patterns and received signal power measurements described herein are often most stable when the receiving device is aligned with or nearly aligned with a peak signal strength direction of an antenna pattern. When the device is aligned with the back lobe of the antenna pattern, small changes in position may yield large and/or non-linear and/or non-monotonic fluctuations in received power. Consider a device at an azimuth angle of approximately 135 degrees or approximately 230 degrees with respect to the north beam, as shown in FIG. 13A. FIG. 13B shows a plot of the antenna pattern in Cartesian format. Within a movement of only about 8 degrees in azimuth about the azimuth angle of approximately 135 degrees or approximately 230 degrees, the receiving device will experience a difference in received signal strength of between 10 dB and 20 dB. This part of the antenna pattern is very unstable. These back lobe characteristics are due, at least in part, to electrical currents on the antenna ground plane which wrap around to the back side of the ground plane and interact with currents that wrapped around from another direction. The small lobe in the back lobe pattern near 180 degrees primarily detracts from the methods and algorithms described herein. For the reasons discussed above, antennas having sharp nulls in the back lobe are desirable. FIG. 14 is an example of an antenna pattern having a sharp null in the back lobe.

The methods and techniques disclosed herein may also be affected by multipath effects. Multiple Input Multiple Output (MIMO) systems use multiple transmission paths between a transmitter and a receiver to attempt to overcome multipath issues. When either the transmit end and/or receive end uses multiple antennas spaced more than a half-wavelength apart, the channels become statistically de-correlated in the presence of multipath fading. This means that a fade which impacts one channel will not necessarily impact the other. This characteristic may be utilized by making the diameter of the transmit beacon antenna smaller than one half wavelength. This makes the farthest two transmitters of the beacon appear to transmit from statistically correlated channels, which may preserve the amplitude differences between the transmitters through a multipath fade event. However, it may not always be necessary to keep the transmitters within one half wavelength of each other. Mathematical techniques may be used to identify when multipath fade events or other signal degradation events occur and the signals associated with one or more transmitters may be temporarily left out of the calculations based on this information.

Some or all of the steps described herein for determining a location of a mobile electronic device relative to a beacon may be performed by one or more computer processors of a mobile electronic device. The mobile electronic device may include a software application, also sometimes referred to a software app or an app, used in performing one or more of the disclosed steps. Performance of the steps may also be divided among two or more software applications. In one variation, one or more of the disclosed steps may be performed on a remote computing system the mobile electronic device communicates with through a wired or a wireless data connection.

The software application may run in the background on the mobile electronic device and become active only when one or more radio signal having a unique identifier associated with the software app is received. For example, a user of a smartphone may download a software app from an app store that is associated with a specific retail store or retail store chain. The software app is loaded onto the smartphone and includes information about UUIDs used by the store or the store chain. The software app monitors the various UUIDs received by the smartphone and determines when the smartphone is receiving one or more UUIDs associated with the retail store or retail store chain. The software app, alone or in conjunction with another computing system, then determines a location using one or more of the techniques disclosed herein.

The determined location may then be used for a number of purposes. Based on the location, a targeted advertisement or message may be pushed to the mobile electronic device and may be displayed on a display of the mobile electronic device. In one example, the mobile electronic device location is determined to be in a shoe department of a department store so a discount promotion for shoes is sent to the electronic device. The real-time nature of the promotion may more effectively encourage a user of the electronic device to act on the offer. Because the offer may be made while the user is present in the specific location, or near the location, the offer may also be made for a more targeted time period (e.g., offer is good for next 30 minutes). In another example, an electronic promotional coupon may be sent to the electronic device, the electronic promotional coupon capable of being displayed on the electronic device and electronically read by an optical scanner, read by a point of sale (POS) system, or electronically transferred from the electronic device to a POS system. In some cases, a user may be required to opt in or agree to some other type of licensing agreement in order to utilize or transmit the user's location information.

In contrast to the example above that includes multiple beacons, a single beacon may cover different areas or departments of a retail store or may cover different stores within a covered area. The location information may be used to select or fine tune an offer or communication. The location information for one or more users may also be tracked to determine customer behaviors or metrics such as: how much time a customer spends in a department before a purchase is made, how much time a customer spends near a particular product before making a decision, how many areas a customer visits before making a purchase, if a customer leaves the area and returns, an order in which a customer visits various departments, where a customer goes in the store after making a purchase, how effective a promotion is in getting a customer to return to an area, how many customers are waiting in line at a checkout counter, how long a customer has been in a dressing room and/or one of many other possible customer metrics or behaviors, including combinations thereof.

As illustrated above, the mobile electronic device, in conjunction with the software application, may perform one or more of these functions by transmitting information to a remote computer. The mobile electronic device may determine the location and an identity of the beacon and transmit the location information to the remote computing system or may perform additional steps with using the location information before transmitting information to the remote computing system. The information may be transferred over the Internet or over another computer network, including combinations thereof. The identity or destination address of the remote computing system may be included in the software application, may be determined by the software application based on the identity of the beacon, and/or may be provided by the beacon in the radio signal transmissions.

While some of the examples above have been described with respect to retail environments and promotional offers, the apparatuses, techniques, and methods disclosed herein may be used for many other types of applications. In one example, multiple beacons may be placed throughout a large building, office complex, or other indoor structure. Location determinations may be made using these techniques in order to guide a person through the building and/or help them find a location in the building. The determined location may be used to help the person navigate in an area they are unfamiliar with. For example, these techniques and methods may be used to help a user find a specific location inside a large hospital complex.

In another case, information may be provided to a user of the mobile device in response to a request from the user. In one example, a user may utilize a software application running on a mobile electronic device to request information about the location of the nearest restroom in a large sports venue, airport, or similar facility. The mobile electronic device may determine the user's present location and transmit it along with the request to a remote computer. In response, the mobile electronic device may receive a response from the remote computer indicating the location of the nearest restroom to be displayed to the user. In one variation, the software application may contain information about the restroom location and may make the determination regarding the nearest restroom without contacting the remote computer. In another variation, the mobile electronic device may continue to determine the location of the user and guide the user to the restroom. This process may involve receiving signals from more than one beacon as the user makes his/her way toward the restroom.

In yet another example, the location information may be used in a cultural or educational venue, such as a museum. The mobile electronic device and the software application may provide informative audio and/or video information to a user of the electronic device based on the user's location in the venue. This may eliminate or reduce the need for the user to start or stop playback of this information or may eliminate the need for the user to stay on a particular schedule as he or she moves through the venue. The fact that the system is able to accurately determine the location of an electronic device means that it may be possible to cover multiple areas of a museum with a single beacon and be able to distinguish between locations associated with exhibits that are relatively close to each other. In order to achieve a similar result using beacons not having the improvements disclosed herein, a larger number of lower power beacons would likely need to be used in order to distinguish between the different areas of the museum to the same level of positioning resolution and/or accuracy as can be achieved using the techniques disclosed herein.

A software application running on an electronic device may also provide the user information regarding what direction to proceed based on one or more of: the determined location of the user, an identity of the beacon, information about the facility, and/or an intended destination. This type of navigational capability may be useful in many applications including, but not limited to, entertainment, sports, gaming, health, assisting the visually impaired, cultural events, museums, social media applications, social marketing, transportation, emergency services, and/or safety.

Figure 15:
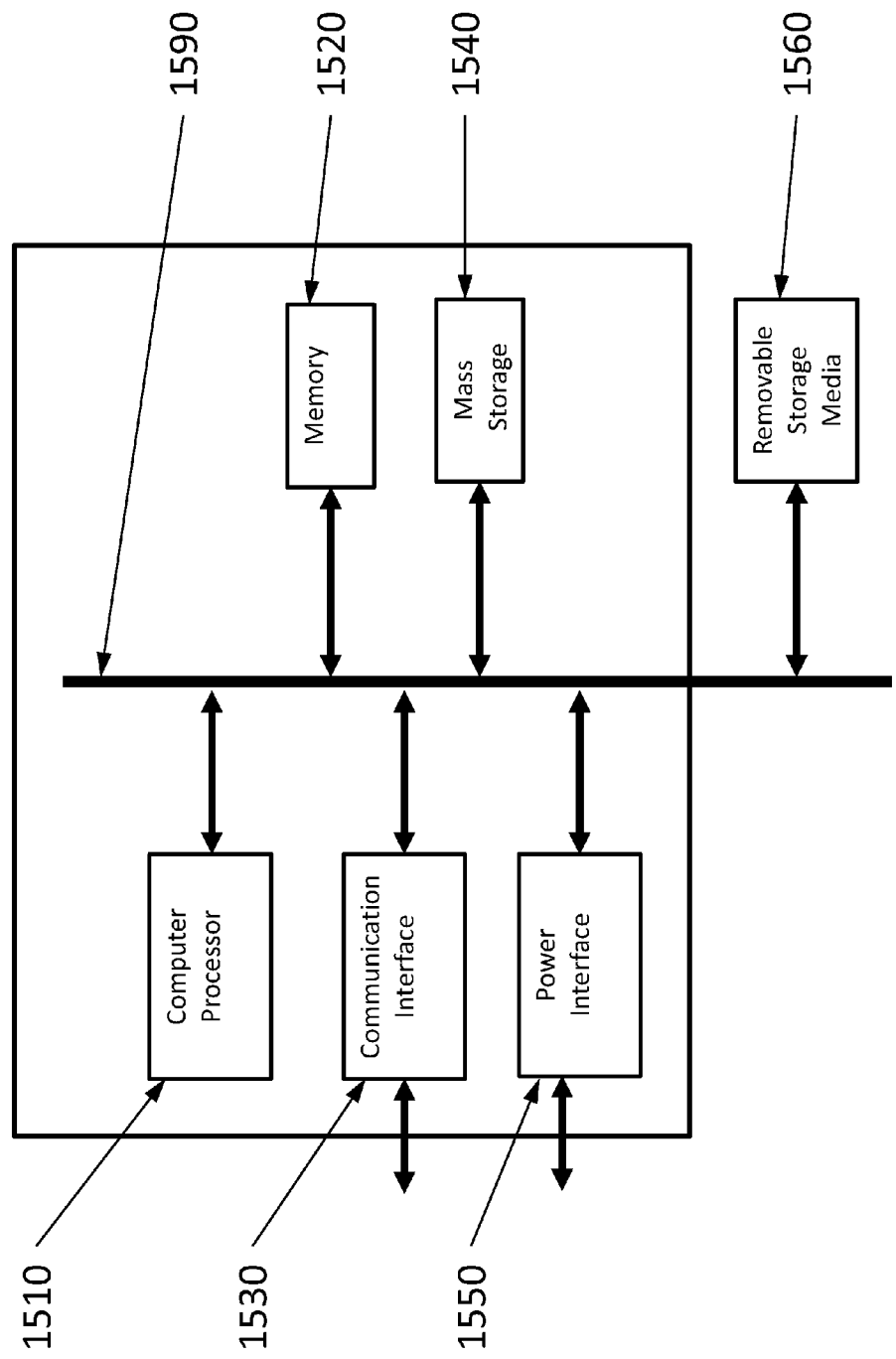
FIG. 15 illustrates computer system with which some embodiments of the methods and techniques disclosed herein may be utilized.

FIG. 15 illustrates computer system 1500 with which some embodiments of the methods and techniques disclosed herein may be utilized. One or more aspects of a beacon, such as beacon 110, may be implemented using one or more computer systems such as computer system 1500. A mobile electronic device receiving signals from a beacon and implementing the steps described herein may also be implemented using one or more computer systems such as computer system 1500. Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware. According to the example of FIG. 15, computer system 1500 may include a bus 1590, a computer processor 1510, a communication interface 1530, a memory 1520, a mass storage 1540, a power interface 1550, and/or a removable storage media 1560.

Computer processor 1510 may be any known computer processor, microprocessor, microcontroller, analog computing circuitry, programmable logic array, or programmable logic device. Computer processor 1510 may also interface to a coprocessor.

Communication interface 1530 may be any type of interface for communicating with a person, a device, or a network. Communication interface 1530 may be configured for communicating using a wired connection, a wireless connection, audio signals, light waves, infrared, or a combination thereof. Communication interface 1530 may be configured for communicating with or over a network such a Local Area Network (LAN), Wide Area Network (WAN), or any network to which computer system 1500 connects. Communication interface 1530 may also be configured to communicate with an electronic device such as a cellular phone, a smartphone, a tablet, a laptop computer, a server, or a digital audio device. The various functions of communication interface 1530 may be distributed across multiple communication interfaces. In one example, communication interface 1530 is a USB interface.

Memory 1520 may include random access memory (RAM), or any other type of dynamic data storage device commonly known in the art. Memory 1520 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 1510 or for another computer processor. In some configurations, memory 1520 may be contained within computer processor 1510 or within one of the other elements of computer system 1500.

Mass storage 1540 may include one or more persistent mass data storage devices or modules that may be used to store data, information, and/or instructions. Mass storage 1540 can include a hard drive, a tape drive, an optical drive, flash memory, a micro electromechanical storage device, or a combination thereof.

Power interface 1550 may be any type of interface for receiving and/or transmitting electrical power. The functions of power interface 1550 may be spread across multiple power interfaces. The functions of power interface 1550 may also be combined into a single connector and/or interface with communication interface 1530. For example, the functions of communication interface 1530 and power interface 1550 may both be implemented in the form of one or more USB interfaces.

Removable storage media 1560 may be any kind of external data storage device including a hard drive, a memory card, a subscriber identity module (SIM) card, flash memory, an optical drive, a tape drive, a micro electromechanical storage device, or a combination thereof.

Bus 1590 communicatively couples the elements of computer system 1500, as well as removable storage media 1560. Bus 1590 may conform to an industry standard bus architecture and protocol or may use a proprietary architecture and/or protocol.

Figure 16:
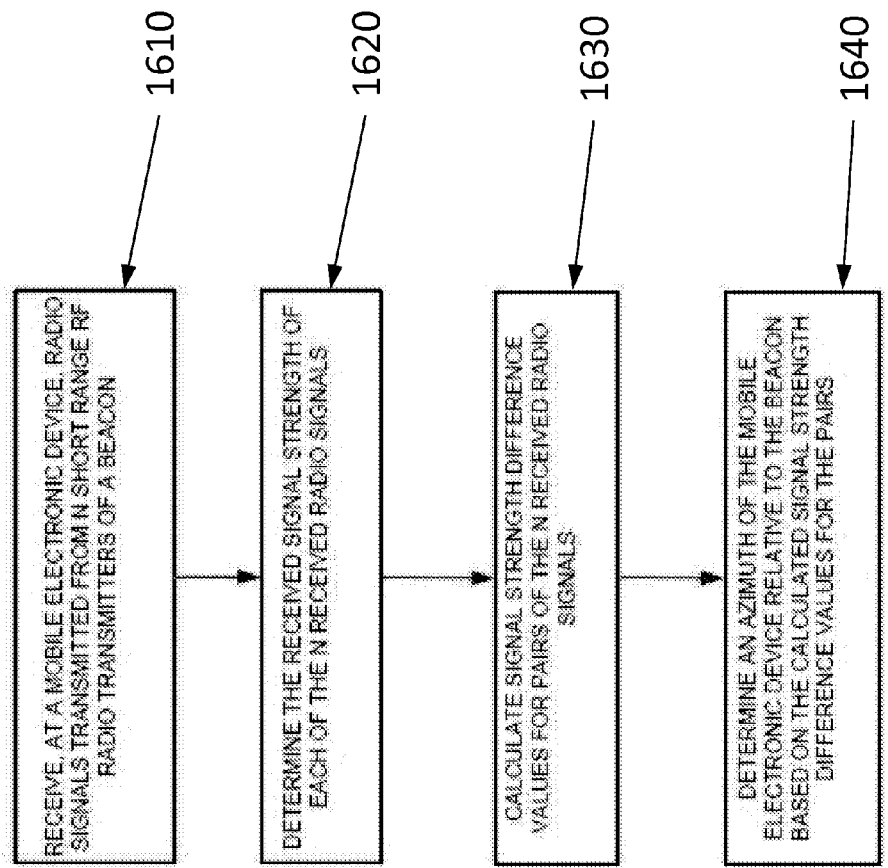
FIG. 16 illustrates a method of determining a position of a mobile electronic device with respect to a beacon in accordance with the techniques disclosed herein.

FIG. 16 illustrates method 1600 of determining a position of a mobile electronic device with respect to a beacon in accordance with the techniques disclosed herein. Method 1600 includes receiving, at a mobile electronic device, radio signals transmitted from N short range RF radio transmitters of the beacon (step 1610). N has an integral value of three or more and each of the radio signals being modulated to include a unique identifier. Method 1600 further includes determining the received signal strength of each of the N received radio signals (step 1620). Method 1600 further includes calculating signal strength difference values for pairs of the N received radio signals (step 1630). The signal strength difference values for each pair is calculated by subtracting the determined received signal strength of a first radio signal of the pair from the determined received signal strength of a second radio signal of the pair. Finally, method 1600 further includes determining an azimuth of the mobile electronic device relative to the beacon based on the calculated signal strength difference values for the pairs (step 1640).

The methods and techniques disclosed herein allow more accurate indoor positioning and location determination to be accomplished using a single beacon. When using beacons with little or no positioning capabilities, a larger number of these inferior beacons must be used to accomplish positioning results similar to those accomplished using the apparatuses, techniques, and methods disclosed herein. Consequently, the apparatuses, techniques, and methods disclosed herein provide similar, or improved, indoor positioning while providing decreased equipment costs, decreased installation costs, decreased maintenance costs, and/or reduced overall system complexity.

In some cases, the techniques disclosed herein may be implemented in the form of a system having one or more beacons and one or more mobile electronic devices that operate according to the examples provided herein.

The components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

As used herein, the term "about" in quantitative terms refers to plus or minus 5 degrees. For example, "about 90 degrees" would encompass 85-95, inclusive, and "about perpendicular" would encompass anything within plus or minus 5 degrees, inclusive, of a perpendicular orientation. "About" may also refer to plus or minus 5% of a value. For example, "about 30%," may refer to anything with the range of 20% to 30%, inclusive. Moreover, where "about" is used herein in conjunction with a quantitative term it is understood that the exact value of the quantitative term is also contemplated and described. For example, the term "about 10%" expressly contemplates, describes, and includes exactly 10%.

The phrases "in some embodiments," "according to some embodiments," "in the embodiments shown," "in other embodiments," "in some examples," "on other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

What is claimed is:

1. A radio frequency (RF) transmission apparatus for facilitating location determination of a mobile electronic device, the apparatus comprising:
a support structure having an axis; and
four RF transmission devices comprising Bluetooth Low Energy transmitters each having a cardioid shaped antenna pattern; wherein
the four Bluetooth Low Energy transmitters are affixed to the support structure and positioned relative to the axis of the support structure such that the peak RF signal strength directions of the four Bluetooth Low Energy transmitters are about equidistantly azimuthally spaced with respect to the axis of the support structure, each RF signal being independent of the other RF signals, and a peak power point of each of the cardioid shaped antenna patterns is oriented about ninety degrees about the axis from each of two of the other cardioid shaped antenna patterns and about one hundred eighty degrees about the axis from a third one of the other cardioid shaped antenna patterns, each of the RF signals modulated to include unique identifying information.

2. The apparatus of claim 1 wherein a first one of the four Bluetooth Low Energy transmitters is associated with a north direction, a second one of the four Bluetooth Low Energy transmitters is associated with an east direction, a third one of the four Bluetooth Low Energy transmitters is associated with a south direction, and a fourth one of the four Bluetooth Low Energy transmitters is associated with a west direction.

3. The apparatus of claim 2 wherein the support structure includes a visible marking indicating a preferred installment orientation of the apparatus relative to earth magnetic north.

4. The apparatus of claim 1 wherein the unique identifying information includes a Bluetooth compliant Universally Unique Identifier (UUID).

5. The apparatus of claim 1 wherein the four RF transmission devices are configured to transmit the respective RF signals on one or more Bluetooth Low Energy advertising channels.

6. The apparatus of claim 1, each of the RF signals being further modulated to include signal strength information.

7. The apparatus of claim 6 wherein the signal strength information includes a Radio Signal Strength Indication (RSSI) value.

8. The apparatus of claim 1 wherein the apparatus includes four or more of the RF transmission devices and one of the RF transmission devices is positioned such that the peak signal strength direction of the one RF transmission device is about parallel to the axis of the support structure and about perpendicular to the peak signal strength directions of the other RF transmission devices.

9. A beacon for transmitting information used in determining a location of a mobile electronic device, the beacon comprising:
a housing;
an electrical power module; and
four radio frequency (RF) transmitters electrically interconnected to the power module, the four RF transmitters each capable of transmitting a respective RF radio signal in compliance with the Bluetooth Low Energy communication standard, each of the four RF transmitters having a respective antenna, the antennas each having a pointing direction and producing a cardioid shaped antenna pattern, the four RF transmitters affixed to the housing such that the pointing directions of the antennas have about ninety degree spatial relationships to each other in a plane such that the pointing directions form four quadrants in the plane, the four RF radio signals being orthogonal to each other and including:
a signal strength value indicating a transmitted signal strength of the associated RF radio signal; and
a Universally Unique Identifier (UUID) that is different than UUIDs of the other RF radio signals.

10. The beacon of claim 9 further comprising a visible marker on the housing to be aligned with earth magnetic north such that each of the pointing directions of the antennas is associated with one of north, south, east, or west.

11. The beacon of claim 9 further comprising a fifth RF transmitter electrically interconnected to the power module, the fifth RF transmitter also capable of transmitting an RF radio signal in compliance with the Bluetooth Low Energy communication standard, the fifth RF transmitter also having an antenna with a pointing direction, the fifth RF transmitter affixed to the housing such that a pointing direction of the antenna of the fifth RF transmitter is about perpendicular to the plane, wherein the RF radio signal of the fifth RF transmitter includes a UUID that is different than the UUIDs of the other four RF radio signals.

12. The beacon of claim 9 wherein the electrical power module includes a battery.

13. The beacon of claim 9 wherein the electrical power module is configured to receive electrical power from an external power source.

14. A method of determining a position of a mobile electronic device with respect to a stationary beacon transmitting three or more radio signals in different directions within a plane, the method comprising:
receiving, at the mobile electronic device, the radio signals transmitted from N of the three or more short range RF radio transmitters, wherein N has an integral value of three or more, each of the radio signals being modulated to include a unique identifier;

determining a received signal strength of each of the N received radio signals;

calculating differences between the received signal strengths of the N received radio signals; and determining an azimuth of the mobile electronic device relative to the beacon based on the calculated differences between the received signal strengths; wherein calculating differences between the received signal strengths of the N received radio signals includes calculating signal strength difference values for pairs of the N received radio signals, wherein the signal strength difference value for each pair is calculated by subtracting the determined received signal strength of a first radio signal of the pair from the determined received signal strength of a second radio signal of the pair.

15. The method of claim 14 wherein:

N equals four;

each of the four different directions is associated with one of north, south, east, or west such that pointing directions of the radio signals have a quadrature orientation with respect to each other forming four quadrants defined by the pointing directions; and calculating the signal strength difference value for the pairs of the received radio signals includes calculating the signal strength difference value for at least four of six possible pairs of the four radio signals.

16. The method of claim 15 wherein determining the azimuth of the mobile electronic device relative to the beacon based on the calculated signal strength difference values for the pairs includes:

associating each of the four received radio signals with one of the four directions based on the unique identifier associated with each of the four received radio signals;

determining a location quadrant from among the four quadrants based on two of the signal strength difference values having the largest absolute values relative to the other signal strength difference values, the location quadrant being the one of the four quadrants in which the mobile electronic device is located;

identifying one of the pairs of the radio signals for which the signal strength difference value of the pair is previously determined to have a linear relationship to azimuthal position within the determined location quadrant; and determining the azimuth by comparing the signal strength difference value of the identified one of the pairs to a previously determined azimuthal relationship between the signal strength difference values and locations in the quadrant.

17. The method of claim 16 wherein comparing the signal strength difference value of the identified one of the pairs to the previously determined azimuthal relationship between the signal strength difference values and the locations in the quadrant includes comparing the signal strength difference value of the identified one of the pairs to a lookup table containing previously measured signal strength difference values for the quadrant.

18. The method of claim 17 wherein comparing to the lookup table includes interpolating between values included in the lookup table.

19. The method of claim 14 wherein the three or more radio signals each includes information indicating a transmit power level of the associated radio signal, the method further comprising:

determining, at the mobile electronic device, one or more receive power levels of one or more of the radio signals; and calculating an estimated distance of the mobile electronic device from the beacon based on differences between the one or more receive power levels and one or more of the transmit power levels received in the radio signals.

20. The method of claim 19 further comprising determining the position of mobile electronic device with respect to the stationary beacon based on the azimuth and the estimated distance.

21. The method of claim 19 further comprising determining the position of the mobile electronic device with respect to the stationary beacon based on the azimuth, based on the estimated distance, and based on a known height of the stationary beacon.

22. The method of claim 14 wherein the stationary beacon transmits an additional radio signal in a direction about perpendicular to the planar directions of the N radio signals, the method further comprising:

receiving, at the mobile electronic device, the additional radio signal;

determining a received signal strength of the additional signal; and determining an elevation of the mobile electronic device relative to the stationary beacon based on a comparison between the received signal strength of the additional radio signal and the received signal strength of one or more of the N received radio signals.

23. The method of claim 21 wherein the elevation is determined based on the comparison between the received signal strength of the additional radio signal and the received signal strength of the one or more of the N received radio signals and is determined further based on the azimuth.

24. The method of claim 14 wherein antenna patterns of the short range RF radio transmitters signals have predetermined roll-off characteristics in elevation planes that are about parallel to the plane, the method further comprising determining an elevation angle of the mobile electronic device relative to the orientation of the beacon based on the determined received signal strengths, based on transmitted signal strengths of the radio signals included in the radio signals, and based on the predetermined roll-off characteristics.

25. The method of claim 24 wherein the predetermined roll-off characteristics of the antenna patterns include signal strength values that have proportional relationships to a cosine of the elevation angle.

26. The method of claim 14 wherein the radio signals are one or more of wireless local area network (WLAN) signals and wireless personal area network (WPAN) signals.

27. A set of computer-readable computer-executable instructions which, when executed by one or more computer processors of a mobile electronic device, direct the one or more computer processors to:

receive RF signal transmissions from at least three short range radio transmitters of a positioning beacon, wherein each of the RF signal transmissions, respectively, includes a transmitted signal strength value and a unique identifier;

determine a received signal strength of each of the received RF signal transmissions;

calculate signal strength difference values for pairs of the received RF signal transmissions, wherein the signal strength difference value for each pair is calculated by subtracting the determined received signal strength of a first RF signal transmission of the pair from the determined received signal strength of a second RF signal transmission of the pair;
determine an azimuth of the mobile electronic device relative to a location of the positioning beacon based on the calculated signal strength difference values for the pairs;
determine a range of the mobile electronic device relative to a location of the positioning beacon; and
determine a position of the mobile electronic device based on the azimuth and based on the range.

28. The instructions of claim 27 which, when executed by the one or more computer processors of the mobile electronic device, further direct the one or more computer processors to transmit a message to a remote computing system through a wireless data connection established by the mobile electronic device in response to determining the position.

29. The instructions of claim 28 wherein the transmitted message includes the determined position.

30. The instructions of claim 28 wherein the transmitted message is transmitted to the remote computing system over the Internet.

31. The instructions of claim 28 which, when executed by the one or more computer processors of the mobile electronic device, further direct the one or more computer processors to determine an identity associated with the positioning beacon and wherein an address of the remote computing system is determined based on the identity associated with the positioning beacon.

32. The instructions of claim 28 which, when executed by the one or more computer processors of the mobile electronic device, further direct the one or more computer processors to:
receive a response message from the remote computing system in response to the message transmitted to the remote computing system; and
display information associated with the received response message to a user of the mobile electronic device on a display of the mobile electronic device.

33. The instructions of claim 32 wherein the positioning beacon is installed in a retail environment and the displayed information includes promotional information related to one or more items or services available in the retail environment.

34. The instructions of claim 33 wherein the one or more items or services are associated with the position of the mobile electronic device.

35. The instructions of claim 33 wherein the promotional information is updated based on determining a new position of the mobile electronic device.

36. A non-transitory computer-readable medium comprising the computer-readable computer-executable instructions of claim 27.

37. A system comprising:
a beacon for transmitting information used in determining locations, the beacon comprising four radio frequency (RF) transmitters each capable of transmitting a respective radio signal in compliance with the Bluetooth Low Energy communication standard, each of the four RF transmitters having a respective antenna, the antennas each having a pointing direction and producing a cardioid shaped antenna pattern, the four RF transmitters oriented such that the pointing directions of the antennas have about ninety degree spatial relationships to each other in a plane such that the pointing directions form four quadrants in the plane, the four radio signals being orthogonal to each other and each including a signal strength value indicating a transmitted signal strength of the associated RF radio signal and a Universally Unique Identifier (UUID) that is different than UUIDs of the other radio signals; and
a mobile electronic device configured to:
receive the four radio signals;
determine a received signal strength of each of the four received radio signals;
calculate signal strength difference values for pairs of the four received radio signals, wherein each signal strength difference value is calculated by subtracting the determined received signal strength of a first radio signal of the pair from the determined received signal strength of a second radio signal of the pair; and
determine an azimuth of the mobile electronic device relative to the beacon based on the calculated signal strength difference values for the pairs.

* * * * *